(12) United States Patent
Nishimura

(10) Patent No.: US 7,450,784 B2
(45) Date of Patent: Nov. 11, 2008

(54) IMAGE RESOLUTION CONVERTING DEVICE

(75) Inventor: Hisashi Nishimura, Tokyo (JP)

(73) Assignee: Olympus Corporation, Tokyo (JP)

( * ) Notice: Subject to any disclaimer, the term of this patent is extended or adjusted under 35 U.S.C. 154(b) by 473 days.

(21) Appl. No.: 11/213,429

(22) Filed: Aug. 29, 2005

(65) Prior Publication Data

US 2006/0045385 A1    Mar. 2, 2006

(30) Foreign Application Priority Data

Aug. 31, 2004  (JP) .......................... P. 2004-252863
Feb. 2, 2005   (JP) .......................... P. 2005-026232

(51) Int. Cl.
*G06K 9/32* (2006.01)

(52) U.S. Cl. ..................................... 382/300

(58) Field of Classification Search .................. 382/300
See application file for complete search history.

(56) References Cited

U.S. PATENT DOCUMENTS

| 5,875,268 | A  | * | 2/1999 | Miyake ..................... 382/276 |
| 5,923,789 | A  | * | 7/1999 | Avinash .................... 382/276 |
| 6,266,373 | B1 | * | 7/2001 | Bakhmutsky et al. ... 375/240.17 |
| 6,389,076 | B2 | * | 5/2002 | Bakhmutsky et al. ... 375/240.17 |
| 6,441,813 | B1 | * | 8/2002 | Ishibashi .................... 345/213 |
| 6,707,467 | B1 | * | 3/2004 | Suga ........................... 345/698 |
| 6,735,349 | B1 | * | 5/2004 | Agarwal et al. ............ 382/298 |
| 7,224,853 | B1 | * | 5/2007 | Moni .......................... 382/300 |
| 2002/0191867 | A1 | * | 12/2002 | Le et al. ..................... 382/300 |
| 2003/0081225 | A1 | * | 5/2003 | Nakami et al. .............. 358/1.2 |
| 2004/0028293 | A1 | * | 2/2004 | Allen et al. ................. 382/300 |
| 2004/0091173 | A1 | * | 5/2004 | Akimoto et al. ............ 382/300 |
| 2004/0114833 | A1 | * | 6/2004 | Jiang .......................... 382/300 |
| 2004/0126037 | A1 | * | 7/2004 | Kim et al. ................... 382/300 |
| 2004/0234165 | A1 | * | 11/2004 | Lee ............................. 382/300 |
| 2005/0036711 | A1 | * | 2/2005 | Abe ............................ 382/300 |
| 2006/0045385 | A1 | * | 3/2006 | Nishimura .................. 382/300 |

FOREIGN PATENT DOCUMENTS

JP    2001-189850    7/2001

* cited by examiner

*Primary Examiner*—Jingge Wu
*Assistant Examiner*—Max Shikhman
(74) *Attorney, Agent, or Firm*—Westerman, Hattori, Daniels & Adrian, LLP.

(57) ABSTRACT

An image resolution converting device for converting an original image into an image of a predetermined resolution includes: a pixel value storage section for storing the pixel values of the pixels included in the original image; a region determining section for successively determining regions, disposed newly generated pixels in accordance with a raster-scanned disposition order of the newly generated pixels; a pixel value read-out controlling section for generating output-control signals serving for outputting the pixel values of the pixels; and an interpolation-calculating section for calculating interpolations of pixel values of the newly generated pixels in accordance with the interpolated pixel values. It is possible to provide an image resolution converting device which can select the pixel groups of the original image, used for generating the new pixels after the resolution conversion while realizing small-size circuits used in the device.

7 Claims, 17 Drawing Sheets

| D11 | D12 | D13 | D14 |
|-----|-----|-----|-----|
| D21 | D22 | D23 | D24 |
| D31 | D32 | D33 | D34 |
| D41 | D42 | D43 | D44 |

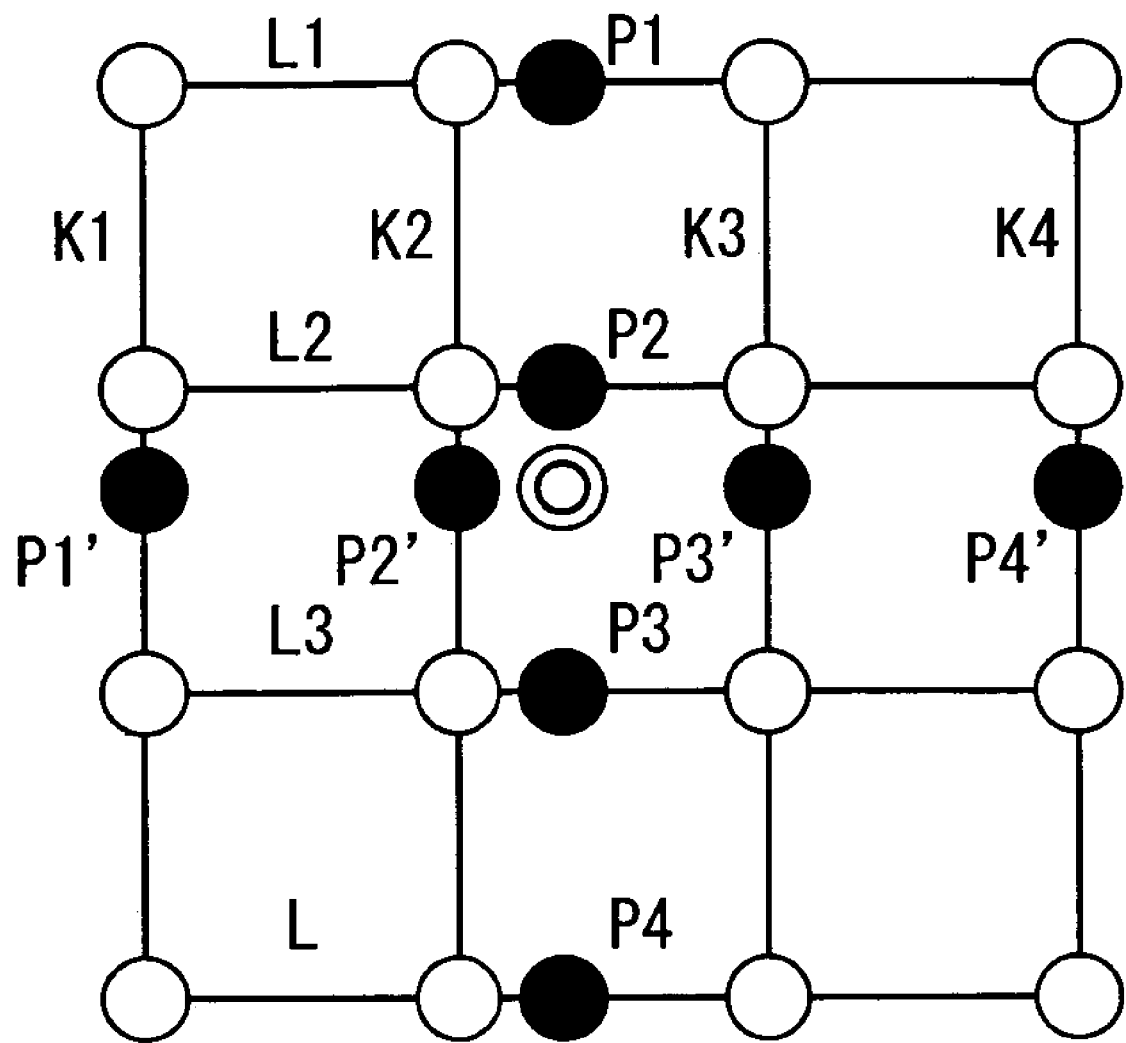

FIG. 9

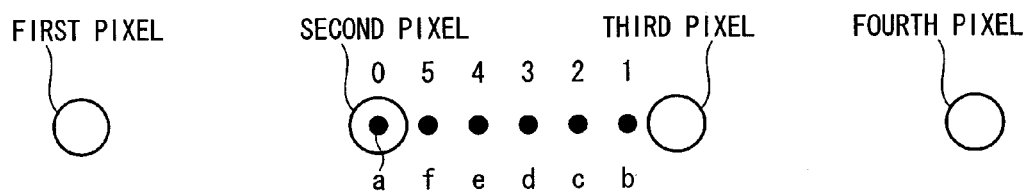

FIG. 10

| COEFFICIENT OF ORIGINAL IMAGE / LOCATION | FIRST COEFFICIENT (FIRST PIXEL) | SECOND COEFFICIENT (SECOND PIXEL) | THIRD COEFFICIENT (THIRD PIXEL) | FOURTH COEFFICIENT (FOURTH PIXEL) |
|---|---|---|---|---|
| 0 | $\gamma_1$ | $\gamma_2$ | $\gamma_3$ | $\gamma_4$ |
| 1 | $\delta_1$ | $\delta_2$ | $\delta_3$ | $\delta_4$ |
| 2 | $\varepsilon_1$ | $\varepsilon_2$ | $\varepsilon_3$ | $\varepsilon_4$ |
| 3 | $\eta_1$ | $\eta_2$ | $\eta_3$ | $\eta_4$ |
| 4 | $\theta_1$ | $\theta_2$ | $\theta_3$ | $\theta_4$ |
| 5 | $\lambda_1$ | $\lambda_2$ | $\lambda_3$ | $\lambda_4$ |

| COEFFICIENT OF ORIGINAL IMAGE / LOCATION | FIRST COEFFICIENT (FIRST PIXEL) | SECOND COEFFICIENT (SECOND PIXEL) | THIRD COEFFICIENT (THIRD PIXEL) | FOURTH COEFFICIENT (FOURTH PIXEL) |
|---|---|---|---|---|
| 0 | $\rho_1$ | $\rho_2$ | $\rho_3$ | $\rho_4$ |
| 1 | $\tau_1$ | $\tau_2$ | $\tau_3$ | $\tau_4$ |
| 2 | $\psi_1$ | $\psi_2$ | $\psi_3$ | $\psi_4$ |

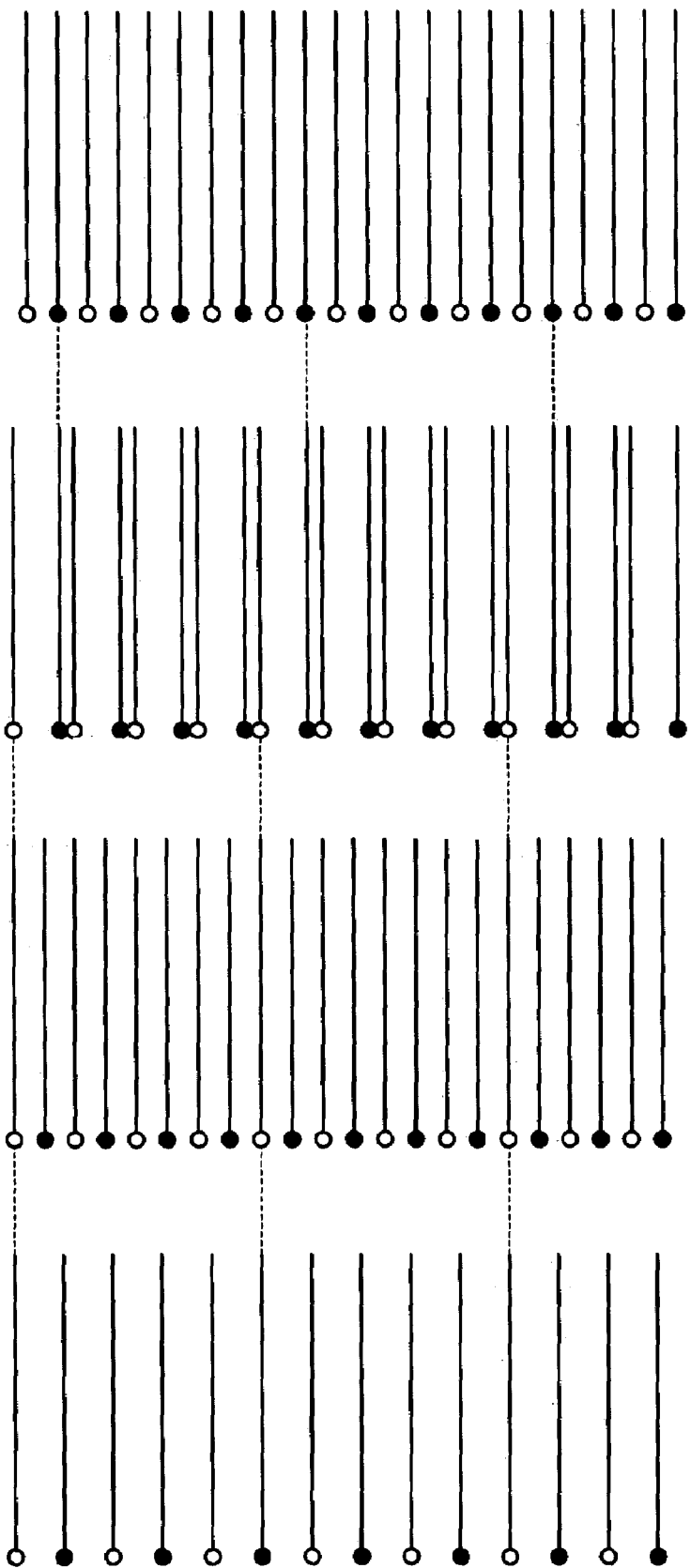

IMAGE RESOLUTION CONVERTING DEVICE

BACKGROUND OF THE INVENTION

Incorporation by Reference

The present application is based on Japanese Patent Applications No. 2004-252863 filed Aug. 31, 2004, and No. 2005-026232 filed Feb. 2, 2005, the contents of which are incorporated herein by reference.

1. Field of the Invention

The present invention relates to an image resolution converting device suitable for converting resolution of original images by an arbitrary magnification ratio in accordance with pixel values of the original images and generating new pixel values in positions corresponding to the converted resolution.

2. Desctiption of Related Art

Conventional resolution converting devices, having line memory for storing image signals and coefficient generators for generating coefficients for interpolation have been proposed in Japanese Unexamined Patent Application, First Publication No. 2001-189850. In the proposed resolution converting devices, the interpolations are calculated by coefficients stored in look-up-tables in accordance with various factors, e.g., a scale-reduction ratio, an enlarging ratio, and positions of newly generated pixels converted from the original image with respect to a horizontal direction and a vertical direction.

SUMMARY OF THE INVENTION

An object of the present invention is to provide an image resolution converting device which enables selecting of the pixel groups of the original image while generating new pixels in accordance with a resolution conversion ratio and maintaining scale size of circuits therein.

A first aspect of the present invention is an image resolution converting device for converting an original image into an image of a predetermined resolution. In this aspect, the image resolution converting device includes: a pixel value storage section for storing the pixel values of the pixels included in the original image; a region determining section for successively determining regions, disposed newly generated pixels in accordance with a raster-scanned disposition order of the newly generated pixels based on a resolution conversion ratio corresponding to the predetermined resolution; a pixel value read-out controlling section for generating output-control signals serving for outputting the pixel values of the pixels, included in the pixel groups corresponding to the determined regions from the pixel value storage section in accordance with the determined regions; and an interpolation-calculating section for calculating interpolations of pixel values of the newly generated pixels in accordance with the interpolated pixel values included in the pixel groups, the outputted pixel values corresponding to the predetermined resolution conversion ratio.

In a second aspect of the present invention, the region determining section includes: a first calculating circuit determining the regions in accordance with the resolution conversion ratio and with respect to a line direction of the image; and a second calculating circuit determining the regions in accordance with the resolution conversion ratio and with respect to a non-line direction crossing the line direction.

In a third aspect of the present invention, the interpolation-calculating section includes: an interpolation coefficient storage section storing groups of interpolation coefficients, to be multiplied by the pixel values included in the pixel groups, in a plurality of addresses, under the conditions that: the resolution conversion ratio is indicated by a fractional expression having an integer numerator and an integer denominator; a total of the addresses is indicated by the integer of the numerator; and each one of the groups of the interpolation coefficients is stored in each group of the pixels; an interpolation coefficient read-out controlling section generating signals for designating the addresses so as to be synchronous with the output-control signals; and a pixel-value-calculating section calculating the pixel values of the newly generated pixels in accordance with the groups of the interpolation coefficients, outputted from the interpolation coefficient storage section in accordance with the signals for designating the addresses, and the pixel values included in the pixel group outputted from the pixel value storage section.

In a fourth aspect of the present invention, the interpolation-calculating section further includes: an image concentration determining section for determining concentration properties included in the original image; and a coefficient selecting section for selecting the interpolation coefficients in accordance with the determination results of the concentration properties, wherein the interpolation coefficients stored in the interpolation coefficient storage section includes the concentration properties included in the original image.

In a fifth aspect of the present invention, the region determining section determines position for disposing the newly generated pixel in the previously determined region.

In a sixth aspect of the present invention, the interpolation-calculating section calculates the pixel value of the newly generated pixel in accordance with the determined positions.

In an seventh aspect of the present invention, the region determining section further includes: a mode determining section for receiving a mode signal having a mode regarding the original image for determining whether the mode signal is a progressive mode or an interlaced mode; a field determining section for determining whether a field included in the original image is an odd field or an even field if the mode signal, is the interlace mode; and an initial value generating section for generating initial values as which the second calculating circuit use during determining the region in accordance with the resolution conversion ratio with respect to the non-line direction and the determination result from the field determining section.

In an eighth aspect of the present invention, region determining section further includes a conversion ratio determining section for determining whether the resolution conversion ratio indicates an enlargement or a scale-reduction, and the initial value generating section generates the initial values in accordance with the resolution conversion ratio with respect to the non-line direction, the determination result from the field determining section, and the determination result from the conversion ratio determining section.

BRIEF DESCRIPTION OF THE DRAWINGS

FIG. 8 is a view for explaining 16-point-interpolation by using 16 points around the new pixels.

FIG. 9 is a view for explaining disposition of the new pixels a to f in the region in which the new pixels will be disposed symmetrically, in the case of 4-point-interpolation at a magnification ratio 11/9.

FIG. 10 is a table showing the interpolation coefficients for interpolating a first pixel to a fourth pixel as original pixels in the case of the 4-point-interpolation.

FIGS. 21A to 21D shows positions of lines after converting the resolution.

DETAILED DESCRIPTION OF THE INVENTION

First Embodiment

Figure 1:
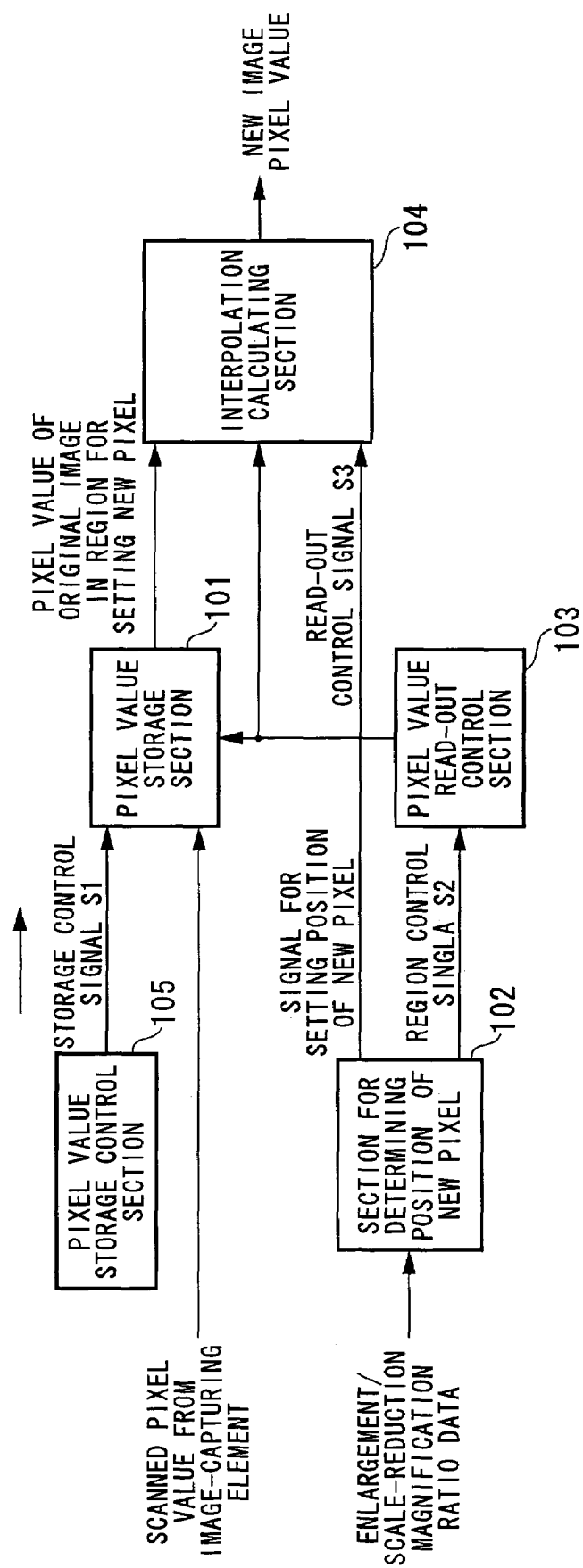
FIG. 1 is a block diagram of an image resolution converting device according to a first embodiment of the present invention.

FIG. 1 is a general view of the image resolution converting device according to a first embodiment of the present invention. Hereinafter, in the embodiments of the present invention, the line direction indicates a horizontal direction, and the non-line direction indicates a vertical direction.

The image resolution converting device includes: a pixel value storage section 101, a region determining section for setting new pixels (hereinafter, a region determining section) 102; a pixel value read-out controlling section 103; an interpolation-calculating section 104; and a pixel value storage controlling section 105.

The pixel values generated by raster-scanning the original image by image-capturing elements, i.e., using a CCD (Charge-Coupled Device) are stored in the pixel value storage section in accordance with storage control signals S1 outputted from the pixel value storage controlling section 105.

The region determining section 102 supplies region control signals S2 for determining the regions in which the new pixels will be disposed to the pixel value read-out controlling section 103 in accordance with enlargement/scale-reduction magnification ratio data supplied externally, and the raster-scanned disposition order of the new pixels. Simultaneously, the region determining section 102 supplies signals for setting positions of the new pixels in the region in which new images are disposed.

The pixel value read-out controlling section 103 generates read-out control signals S3 as output-control signals based on the supplied region control signals S2 and supplies the read-out control signals S3 to the pixel value storage section 101. By doing this, the pixel values of pixels of the original image disposed in the regions in which the new pixels will be disposed are read out from the pixel value storage section 101 and supplied to the interpolation-calculating section 104.

The interpolation-calculating section 104 outputs values of the new pixels, having converted resolution and corresponding to the enlargement/scale-reduction magnification ratio data, by multiplying the interpolation coefficients stored in storage sections, i.e., SRAMs therein, with the pixel values of the original image supplied from the pixel value storage section 101.

Next, the pixel value storage section 101 is explained in detail.

Figure 2:
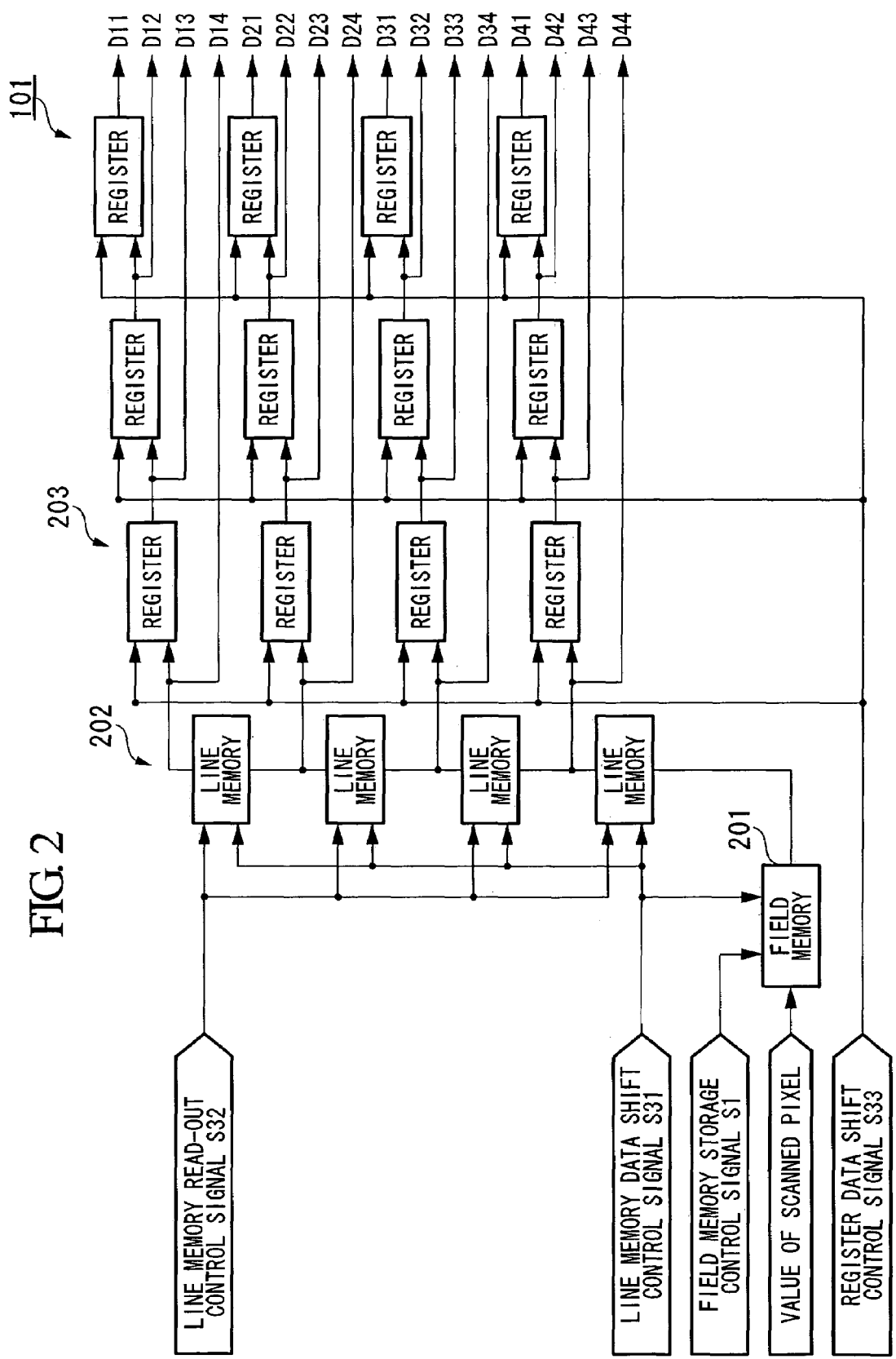
FIG. 2 is a block diagram of pixel value storage section 101.

FIG. 2 is a block diagram showing the above pixel value storage section 101. In the pixel value storage section 101, the pixel group, surrounding a region in which the new pixels will be disposed, has 16 pixels.

In FIG. 2, the pixel value storage section 101 has field memory 201 for storing the pixel values of the original image raster-scanned by the image-capturing element, a plurality (4 in the drawing) of line memories 202 for storing the pixel values of the original image with respect to each line, and a plurality (12 in the drawing) of registers 203 for storing pixel values of the original image wherein each register stores one pixel.

The pixel values of the original image raster-scanned by the image-capturing element, i.e., CCD, and address numbers are related with respect to the raster-scanned order in accordance with the control signals S1 (i.e., field memory storage control signals shown in FIG. 2) supplied from the pixel value storage controlling section 105, and after that, the pixel values are stored in the field memory 201. The field memory 201 stores image data with respect to a part of the image. This image data storage is synchronous with, for example, the raster-scanning.

The read-out control signals S3 supplied from the pixel value read-out controlling section include: line memory data shift control signals S31 for shifting the stored data stored between the field memory 201 and the line memories 202; read-out control signals S32 for reading data disposed on an arbitrary line by supplying addresses-to-read to the line memories 202; and register data shift control signals S33 for shifting the stored data with the registers 203. These three kinds of signals are supplied to the field memory 201, the line memories 202, and the registers 203 respectively.

Operations conducted in the pixel value storage section 101 shown in FIG. 2 are explained.

For example, in order to generate new pixels from the pixel group in an original image having 16 pixels disposed 4 pixels by 4 pixels, pixels corresponding to one line in an image stored in the field memory 201 are read out in accordance with the line memory shift control signals S31, and stored in one of the line memories 202, disposed in a lowest part of the line memories 202. Pixels corresponding to the next line in the image stored in the field memory 201 are read out in accordance with shift-control timing based on the line memory data shift control signals S31. In addition, the pixels are stored in the line memories 202 disposed above the previous one of the line memories 202.

As a result, pixel values, included in 4 lines in a horizontal direction in which resolution will be converted, are stored in each line memory 202. The pixel values, stored in each one of four line memories 202 and corresponding to the horizontal line, are stored in the registers 203 disposed in a first row of register group in accordance with addresses designated by the read-out control signals S32. For example, a right-most pixel value is outputted from each one of four line memories 202. By doing this, pixel values corresponding to four pixels are stored in the registers 203 in the first row and disposed in an array direction.

The pixel values corresponding to each horizontal line stored in the four line memories 202 are read out from each line memory 202 successively in accordance with timing based on the line memory data shift control signals S31. The reading of the pixel values is shifted successively in order, from the first row, to the second row, to the third row, and the fourth row in the group of registers 203, in accordance with timing based on the register data shift control signals S33.

By doing this, it is possible to obtain pixel values D11, D12, D13, D14, D21, D22, D23, D24, D31, D32, D33, D34, D41, D42, D43, and D44 included in the pixel group of the original image, the pixel group being formed by 16 pixels disposed in 4 pixels by 4 pixels surrounding the region in which the new pixels will be disposed.

Figures 3, 4:
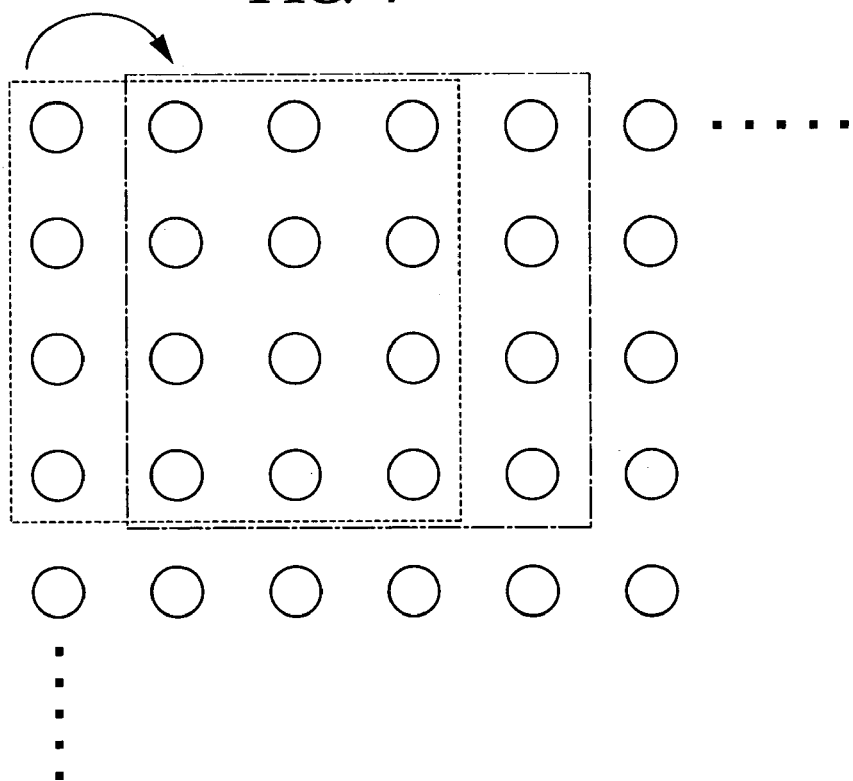
FIG. 3 is an example of disposition of the pixel groups of the original image including the region in which the newly generated pixels will be disposed.
FIG. 4 is a view for explaining determining of regions in the case of 16-point-interpolation.

Next, generating the new pixels is explained. FIG. 3 shows 16 pixels in the pixel group formed by a 4-by-4 pixel disposition surrounding the region in which the new pixels will be disposed. New pixels are generated in arbitrary positions in a region surrounded by 4 pixels, i.e., D22, D23, D32, and D33, disposed in a center portion of the pixel group. That is, the positions of 16 pixels included in the original image are determined so that the new pixels are disposed in arbitrary positions in a region surrounded by the 4 pixels, i.e., D22, D23, D32, and D33. The pixel value of each of the new pixels is determined by interpolation calculation in accordance with the pixel values of the 16 pixels included in the original image.

Figure 13:
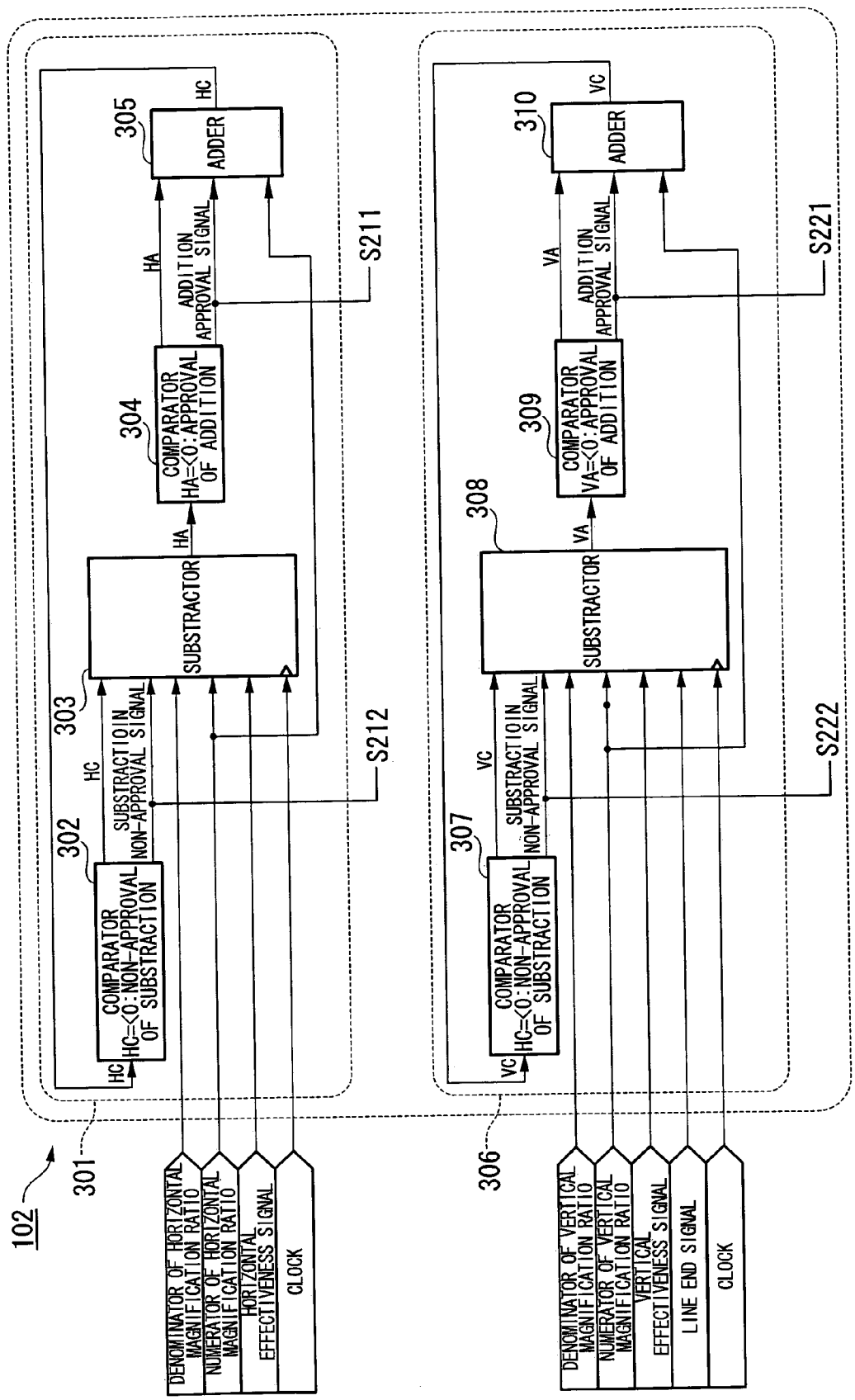
FIG. 13 is a schematic diagram showing the region determining section.

As shown in FIG. 4, at first, a region including 16 pixels (indicated as "○") of the original image, having a 4-by 4 disposition, disposed in a region surrounded by short-dash lines, is determined so as to be used in the interpolation calculation (pixels used in the interpolation calculation are obtained). After the region is determined for the first time, the determining of region is shifted to a region including 16 pixels indicated by alternate long and short-dash lines in accordance with region movement command signals (as shown in FIG. 13).

Figure 5:
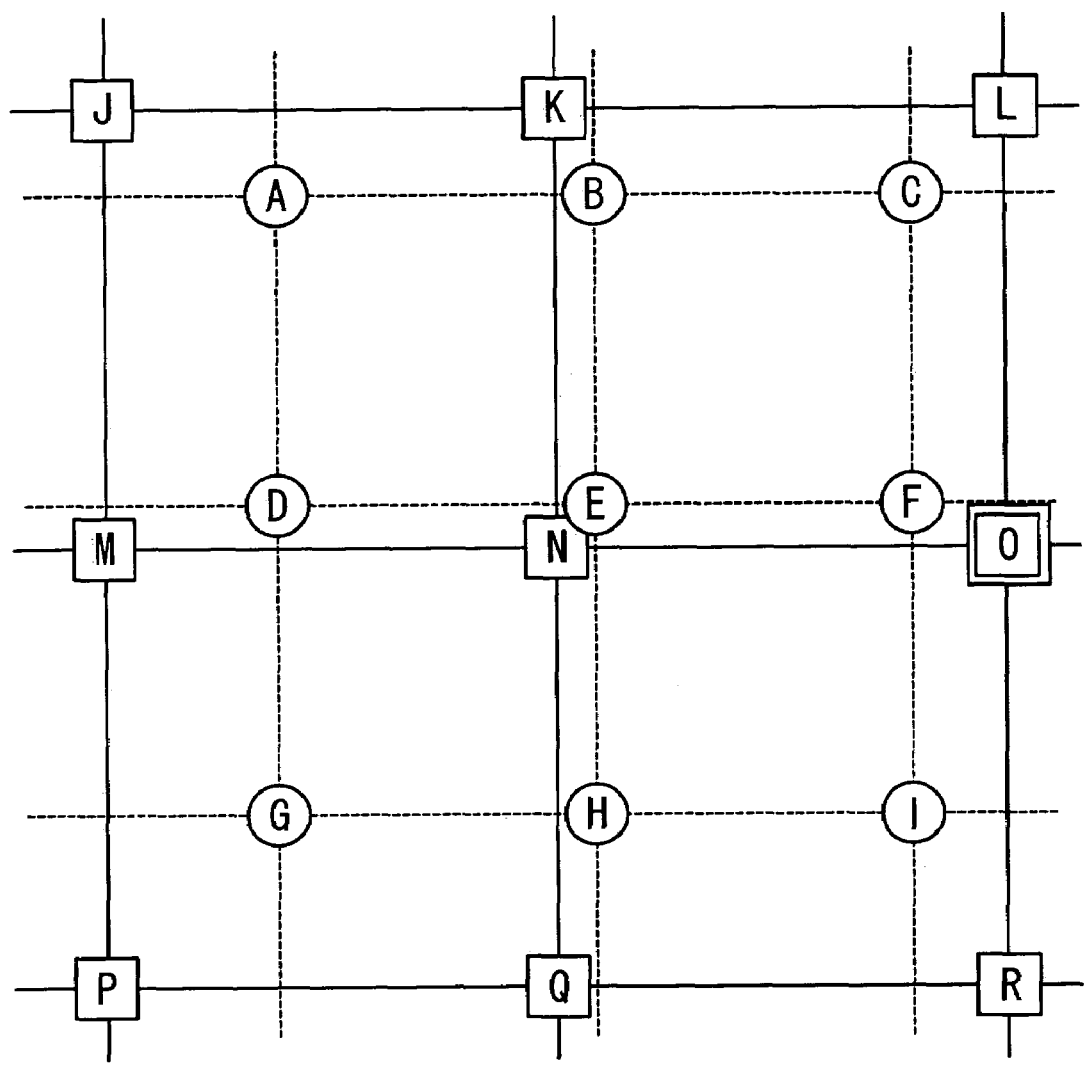
FIG. 5 is a view for explaining the region in which the new pixels will be disposed.

FIG. 5 is a view of the region in which the new pixels will be disposed.

The basic idea of the region determining section 102 is explained with reference to FIG. 5. FIG. 5 shows an example for enlargement in which points "□" indicate the pixels of the original image, and points "○" indicate the new pixels generated in the enlargement.

As shown in FIG. 5, the quantities of the new pixels disposed in the regions have varieties. For example, 4 pixels are disposed in a region surrounded by one group of pixels, i.e., K, L, N, and O. On the other hand, only pixel G is disposed in a region surrounded by group of pixels M, N, P, and Q. The new pixels shown in this drawing are limited to those disposed nearest to pixels indicating the original image surrounding the region in which the new pixels will be disposed. In other words, some regions in the 16 pixels are not shown in the drawing.

Figure 6:
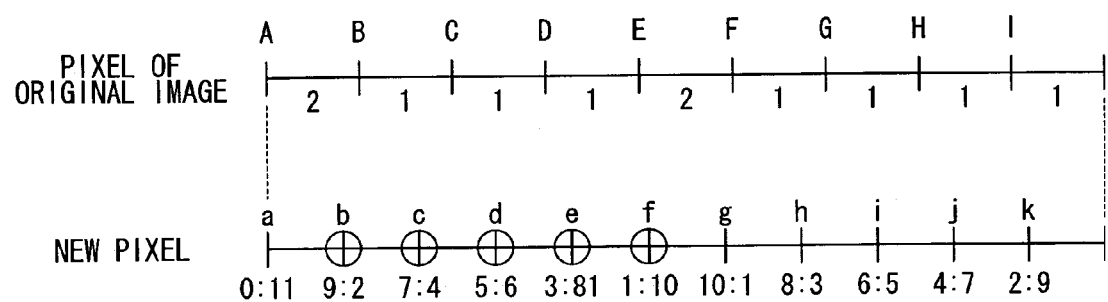
FIG. 6 is a view for explaining a conversion for an enlargement.

Next, a method for calculating pixel values of the new pixels is explained. FIG. 6 shows an example for the enlargement. An enlargement of the original image by 11/9 in a horizontal direction is equivalent to generating eleven new pixels from 9 pixels of the original image. Nine points (except a right-most point) A to I dotted on the upper line shown in FIG. 6 indicate nine pixels of the original image. Eleven points (except a right-most point) a to k dotted on the lower line shown in FIG. 6 indicate eleven new pixels. In FIG. 6, numbers shown beneath the line indicating the pixels of the original image indicate quantity of new pixels generated within a section between two pixels of the original image. For example, two new pixels a and b are generated between the pixels A and B. Also, in FIG. 6, ratios, shown near the points indicating the new pixels in the lower line, indicate positions (i.e., internal-dividing ratio) for dividing a section (line segment) of the upper line indicating the pixels of the original image. For example, the point "a", disposed left-most on the lower line shown in FIG. 6, divides a line segment A-B by the internal-dividing-ratio 0:11 shown at the left-most of the lower line. Similarly, each of the ratios corresponding to the points "b" to "k" disposed on the lower line indicating the new pixels divide corresponding line segments, i.e., segments B-C to H-I, and in addition, right-most segment, by 9:2, 7:4, 5:6, 3:8, 1:10, 10:1, 8:3, 6:5, 4:7, and 2:9.

These internal-dividing ratios divide each line segment disposed on the upper line indicating the pixels of the original image. For a simpler example, in the case of two-point interpolation, the internal-dividing ratio corresponding to point "b", for dividing the line segment A-B indicating the pixels of the original image, is indicated as 9:2. Thus, in order to obtain the interpolation coefficient corresponding to point "b" indicating the new pixel, the interpolation coefficient which will be multiplied with point "A" indicating the pixel of the original image is 2/11. The interpolation coefficient which will be multiplied with point "B" indicating the pixel of the original image is 9/11. Accordingly, an interpolated value corresponding to point "b" indicating the new pixel can be calculated by a formula: b=(2/11)×A+(9/11)×B. "A" and "B" indicate pixel values included in the pixels of the original image.

Figure 7:
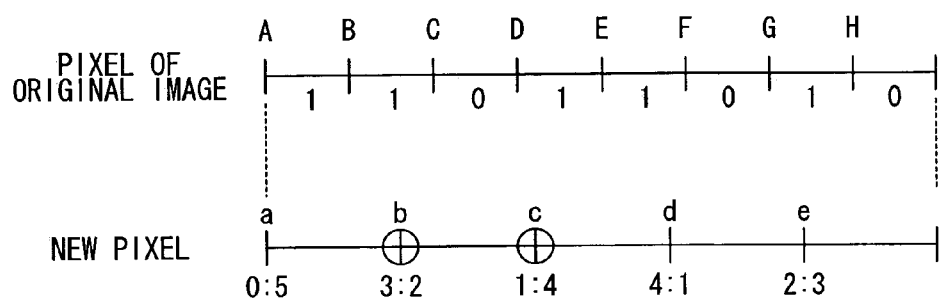
FIG. 7 is a view for explaining a conversion for a scale-reduction.

FIG. 7 shows an example for scale-reduction. A scale-reduction of the original image by 5/8 in a horizontal direction is equivalent to generating five new pixels from 8 pixels of the original image. Eight points (except a right-most point) A to H dotted on the upper line shown in FIG. 7 indicate eight pixels of the original image. Five points (except a right-most point) a to e dotted on the lower line shown in FIG. 7 indicate five new pixels. In FIG. 7, numbers shown beneath the line indicating the pixels of the original image indicate quantity of new pixels generated within a section between two pixels of the original image. Also, in FIG. 7, ratios, shown near the points indicating the new pixels on the lower line, indicate positions (i.e., internal-dividing ratios) for dividing a section (line segment) of the upper line indicating the pixels of the original image. In FIG. 7, with respect to the pixels of the new image, point "a" on the left end of the lower line indicates that point "a" divides the line segment A-B by the internal dividing ratio 0:5. Similarly, each of the ratios corresponding to points "b" to "e" disposed on the lower line indicating the new pixels divides corresponding line segments, i.e., segments B-C to G-H, by 3:2, 1:4, 4:1, and 2:3.

The relationship between the internal dividing ratio and the interpolation coefficient is the same as the relationship shown in FIG. 6.

With regard to the internal dividing ratios, i.e., 9:2, 7:4, 5:6, 3:8, 1:10, 10:1, 8:3, 6:5, 4:7, and 2:9, for dividing the line segments shown in the upper line shown in FIG. 6, it is found that the ratios from 9:2 to 1:10 and the ratios from 10:1 to 2:9 are symmetrical when the new pixels are generated on the lower line shown in FIG. 6.

Similarly, with regard to the internal dividing ratios, i.e., 3:2, 1:4, 4:1, and 2:3, for dividing the line segments shown in the upper line shown in FIG. 7, it is found that the ratios from 3:2 to 1:4 and the ratios from 4:1 to 2:3 are symmetrical when the new pixels are generated on the lower line shown in FIG. 7.

Figure 16:
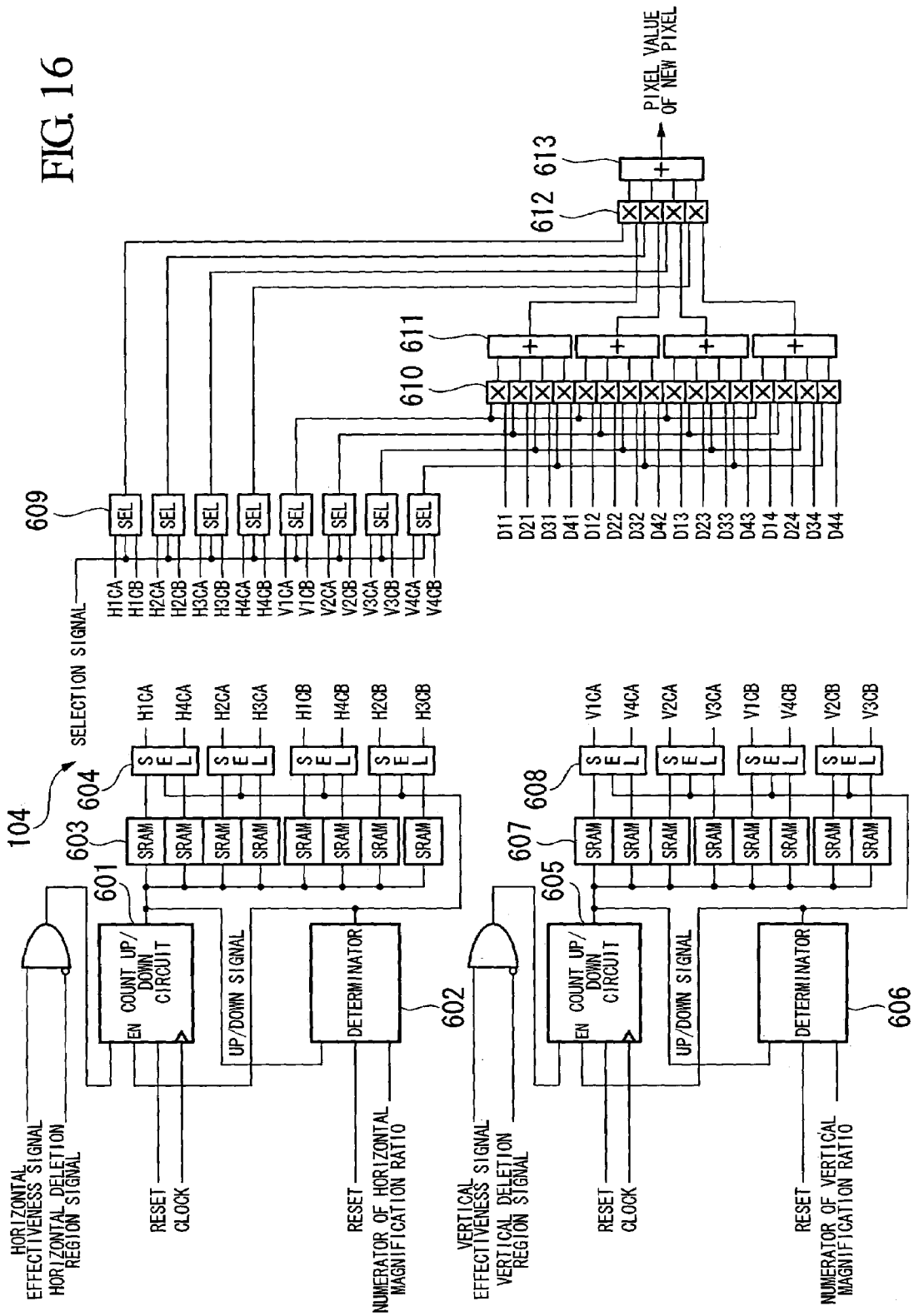
FIG. 16 is a schematic diagram showing the interpolation-calculating section having two variations for interpolating the pixels.

The interpolation coefficients, multiplied with the pixels of the original image for calculating the pixel values of the new pixels, must be stored in the interpolation coefficient storage section, i.e., SRAMs 603 and 607 shown in FIG. 16. When the magnification ratio, i.e., the magnification or scale-reduction, is indicated by a form of irreducible fraction, it is not necessary to store all the interpolation coefficients indicated by the integer numerators corresponding to magnification. That is, if the above symmetry is used, necessary capacity of the SRAMs will be half the capacity necessary in the above non-symmetric case. More exactly, the necessary capacity will be a quotient of the integer numerator divided by 2, to which 1 is added. That is, in the case of FIG. 6, 5 ratios. i.e., 9:2, 7:4, 5:6, 3:8, and 1:10, will be necessary as the internal dividing ratios so as to calculate the interpolation coefficients with respect to each new pixel used for the conversion, i.e., magnification, or scale-reduction, of the resolution of the original image. Therefore, only 5 interpolation coefficients, i.e., 9:2, 7:4, 5:6, 3:8, and 1:10, need to be stored in the SRAMs. In the case of FIG. 7, only 2 ratios, i.e., 3:2 and 1:4 will be necessary. Therefore, only 2 interpolation coefficients need to be stored in the SRAMs.

The pixel values of the new pixels in the case of 16-point interpolation can be calculated by calculating the pixel values of the new pixels while maintaining the pixels of the original image in the pixel value storage section 101 shown in FIG. 2, multiplying all the pixel values of the original image with the coefficients corresponding to each pixel value of the original image, and adding the calculated pixel values of the new pixels and the product of the multiplication.

FIG. 8 is a view for explaining the 16-point-interpolation by using 16 points around the new pixels. In FIG. 8, reference symbol "◎" indicates new pixels. Reference symbol "○" indicates each one of 16 pixels of the original image disposed around the new pixels. Reference symbols L1 to L4 indicate four line segments each of which passes through 4 pixels in a horizontal line. Reference symbols K1 to K4 indicate four line segments each of which passes through 4 pixels in a vertical line.

Reference symbols "●" indicate four pixels, P1 to P4, generated temporarily and disposed of, with respect to the vertical direction, i.e., line segments L1 to L4, in the drawing, as high as the reference symbol "◎" which indicates the new pixels.

A temporary new pixel P1 can be calculated by interpolating the pixel values, i.e., A, B, C, and D, indicating four pixels of the original image, disposed in one-dimensionally-disposed horizontal line L1. If α1 to α4 indicate each of four interpolation coefficients corresponding to distance from each one of α1 to α4 to the temporary new pixel P1 disposed on the line segment L1, and if a sum of α1 to α4 is 1, the pixel value P1 can be calculated using the formula P1=α1×A+α2×B+α3×C+α4×D. With regard to the horizontal line segments L2 to L4, interpolation of the temporary new pixel values P2 to P4, indicated by reference symbol "●" can be calculated similarly.

In addition, an interpolation Q of the pixel value indicated by "◎" can be calculated using the formula Q=β1×P1+β2×P2+β3×P3+β4×P4 if β1 to β4 indicate each of four interpolation coefficients corresponding to distance from each one of P1 to P4, disposed as high as "◎", and indicating the temporary new pixels, to the reference "◎", indicating the new pixel disposed on the line segment L1, and if a sum of β1 to β4 is 1. In this case, P1 to P4 indicate the pixel values of P1 to P4.

In FIG. 8, reference symbols "●" indicate P1' to P4' as four temporary new pixels disposed in each of the vertical line segments K1 to K4 as high as the reference symbol "◎" indicating the new pixels. The interpolation Q of the new pixel value "◎" may be calculated after calculating the temporary new pixel values, i.e., P1' to P4' disposed on each of the line segments K1 to K4 instead of the above horizontal line segments L1 to L4.

In the case of magnification of 11/9 as shown in FIG. 6, the new pixels a to k are generated with reference to pixels A to I of the original image. With respect to two-dimensions, this magnification is 16-point interpolation. With respect to one-dimension, this magnification is 4-point interpolation. When at least one or two new pixels are generated, the region, i.e., line segments indicating the pixels of the original image, is shifted one by one. However, the new pixels a to f are disposed between a second pixel and a third pixel as shown in FIG. 9 showing in total four pixels "○" each indicating the original image, i.e., the first to the fourth pixel from the left-hand side in order. In the drawing, the new pixels g to k are omitted because the positions of the pixels have symmetry.

The new pixel corresponding to the second pixel "a" indicates a dividing ratio 0:11 between the second pixel and the third pixel. In this case, the internal dividing point "a" indicates a location 0 (zero) stored in the interpolation coefficient storage section. The internal dividing points "b", "c", "d", "e", and "f", corresponding to the ratios, in order from the left-hand side of the drawing, i.e., 9:2, 7:4, 5:6, 3:8, and 1:10, indicate locations 1, 2, 3, 4, and 5 stored in the interpolation coefficient storage section. The interpolation coefficient storage section corresponds to an SRAM shown in FIG. 16.

FIG. 10 is a table showing the interpolation coefficients for interpolating a first pixel to a fourth pixel as original pixels in the case of 4-point-interpolation. The pixel value of the new pixel b can be calculated by reading out coefficients, i.e., a first coefficient δ1 to a fourth coefficient δ4 from location 1 stored in each of the SRAMs, i.e., a first SRAM to a fourth SRAM, multiplying all 4 pixel values of the original image with the read-out coefficients, and adding them. The pixel value of the new pixel e can be calculated by reading out coefficients, i.e., a first coefficient θ1 to a fourth coefficient θ4 from location 4 stored in each of the SRAMs, i.e., a first SRAM to a fourth SRAM, multiplying all 4 pixel values of the original image with the read-out coefficients, and adding them.

The pixel value of the new pixel j shown in FIG. 6 can be calculated by reading out coefficients, i.e., a first coefficient ε1 to a fourth coefficient ε4 from location 2 stored in each of the SRAMs, i.e., a first SRAM to a fourth SRAM, reversing the disposition order, multiplying all 4 pixel values of the original image with the read-out coefficients, and adding them. Similarly, the pixel value of the new pixel g can be calculated by reading out coefficients, i.e., a first coefficient λ1 to a fourth coefficient λ4 from location 5 stored in each of the SRAMs, i.e., a first SRAM to a fourth SRAM, reversing the disposition order, multiplying all 4 pixel values of the original image with the read-out coefficients, and adding them. The above calculations can be used with respect to calculations with respect to the line segments disposed in the vertical direction.

Figures 11, 12:
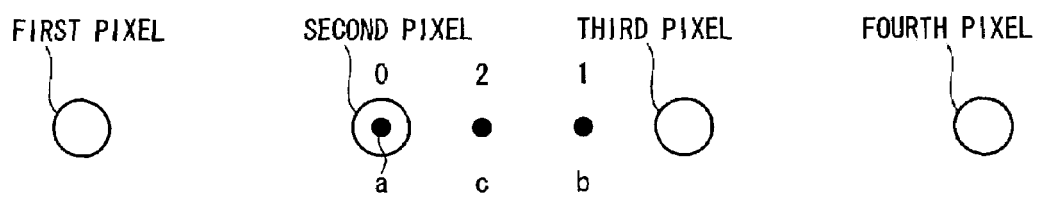
FIG. 11 is a view for explaining disposition of the new pixels a to c in the region in which the new pixels will be disposed symmetrically, in the case of 4-point-interpolation at a magnification ratio 5/8.
FIG. 12 is a table showing the interpolation coefficients for interpolating a first pixel to a fourth pixel as original pixels in the case of the 4-point-interpolation.

Next, instead of the above magnification, a scale-reduction is explained with respect to FIGS. 11 and 12. When the magnification ratio is changed, information stored in the interpolation coefficient storage sections, i.e., SRAMs, in the interpolation-calculating section (see FIG. 16) is overwritten. That is, the relationship between the locations and the interpolation coefficients stored in the SRAMs, shown in FIG. 10, is overwritten as shown in FIG. 12.

For example, in the case of scale-reduction of 5/8 as shown in FIG. 7, the new pixels a to e are generated with reference to pixels A to H of the original image. With respect to two-dimensions, this magnification is 16-point interpolation. With respect to one-dimension, this magnification is 4-point interpolation. When no new pixels are generated, or when one new pixel is generated, the region, i.e., line segments indicating the pixels of the original image, is shifted once at a time. If there is not a new pixel, the shift does not occur. However, it is possible to understand that the new pixels a to c are disposed between a second pixel and a third pixel as shown in FIG. 11 showing in total four pixels "○" each indicating the original image, i.e., the first to the fourth pixel from the left-hand side in order. In the drawing, the new pixels d and e are omitted because the positions of the pixels have symmetry.

The new pixel corresponding to the second pixel "a" indicates a dividing ratio 0:5 between the second pixel and the third pixel. In this case, the internal dividing point "a" indicates a location 0 (zero) stored in the interpolation coefficient storage section. The internal dividing points "b" and "c", corresponding to the ratios, in order from the left-hand side of the drawing, i.e., 3:2 and 1:4, indicate locations 1 and 2 stored in the interpolation coefficient storage section. The interpolation coefficient storage section corresponds to the SRAM shown in FIG. 16.

FIG. 12 is a table showing the interpolation coefficients for interpolating a first pixel to a fourth pixel as original pixels in the case of the 4-point-interpolation shown in FIG. 11. For example, the pixel value of the new pixel b can be calculated by reading out coefficients, i.e., a first coefficient $\tau 1$ to a fourth coefficient $\tau 4$ from location 1 stored in each of the SRAMs, i.e., a first SRAM to a fourth SRAM, multiplying all 4 pixel values of the original image with the read-out coefficients, and adding them. Similarly, the pixel value of the new pixel c can be calculated by reading out coefficients, i.e., a first coefficient $\phi 1$ to a fourth coefficient $\phi 4$ from the location 2 stored in each of the SRAMs, i.e., a first SRAM to a fourth SRAM, multiplying all 4 pixel values of the original image with the read-out coefficients, and adding them.

On the other hand, the pixel value of the new pixel e shown in FIG. 7 can be calculated by reading out coefficients, i.e., a first coefficient $\tau 1$ to a fourth coefficient $\tau 4$ from location 2 stored in each of the SRAMs, i.e., a first SRAM to a fourth SRAM, reversing the disposition order, multiplying all 4 pixel values of the original image with the read-out coefficients, and adding them. Similarly, the pixel value of the new pixel d can be calculated by reading out coefficients, i.e., a first coefficient $\phi 1$ to a fourth coefficient $\phi 4$ from location 2 stored in each of the SRAMs, i.e., a first SRAM to a fourth SRAM, reversing the disposition order, multiplying all 4 pixel values of the original image with the read-out coefficients, and adding them. The above calculations can be used with respect to calculations with respect to the line segments disposed in vertical direction.

For example, an enlargement of the original image by 11/9 in a horizontal direction is equivalent to generating eleven new pixels from nine pixels of the original image. The reading-out of the pixel groups repeats twice corresponding to two pixels, obtained by subtracting 9 from 11 at two positions (more specifically, a first region and a fifth region). The above calculations can be used with respect to calculations with respect to the line segments disposed in the vertical directions.

As explained above, when magnifying the original image, some pixel groups may have to be read repeatedly with respect to the region to which the pixel group corresponds. Therefore, instructions are necessary to repeat reading the pixels group by group with respect to the horizontal direction and reading the pixels line by line with respect to the vertical direction.

Also, new pixels are not generated in some regions when reducing the scale of the original image. For example, a scale-reduction of the original image by 5/8 in a horizontal direction is equivalent to generating five new pixels from 8 pixels of the original image. In this case, there are no new pixels generated in three regions corresponding to, more specifically, a third, a sixth, and an eighth line segment. The three regions indicate a difference between 8 and 5 shown by the scale-reduction ratio 5/8. The above calculations can be used with respect to calculations with respect to the line segments disposed in the vertical direction.

As explained above, new pixels are not generated in some regions when reducing the scale of the original image. Pixel values, calculated with regard to the original image and corresponding to these regions having no new pixels, must not be outputted to circuits disposed thereoutside. For example, more specifically, the following operation is necessary, i.e.: (1) the pixel groups must not be outputted to the interpolation-calculating section 104; (2) the pixel groups are outputted but the interpolations thereof are not calculated in the interpolation-calculating section 104; or (3) the interpolations of the pixel groups are calculated in the interpolation-calculating section 104, but output of the calculated interpolation is blocked in the circuits disposed thereoutside. Therefore, it must be that there are the pixels not generated in pixel groups, line by line with respect to the vertical direction, if some pixel groups do not correspond to the new pixels.

FIG. 13 is a schematic diagram of a region determining section 102.

The region determining section 102 is a block, shown in FIG. 13, for generating region control signals S2 for the above instructions. That is, the region determining section 102 generates the region control signals S2 for indicating, i.e., whether regions, in which the new pixels will be disposed, will be moved with respect to the horizontal and the vertical directions, and whether new pixels must be generated with respect to the regions. Also, the region determining section 102 outputs signals for indicating positions of the new pixels in the regions simultaneously.

The region determining section 102 is explained with reference to FIG. 14.

The magnification ratio M/N (M and N are integers) for magnifying the resolution indicates that M pixels are generated from N pixels in the original image. More specifically, if N regions (indicated by line segments "■" dotted on line A shown in FIG. 14) surrounded by (N+1) pixels (indicated by line segments "■" dotted on line B shown in FIG. 14) included in the original image are divided into M×N virtual sections, every $N^{th}$ section indicates a position in which new pixels will be generated.

The region determining section 102 generates the region control signals S2 by determining, i.e., in which of the N regions the new pixels will be generated, and the positions of the new pixels in the regions.

The positions of the new pixels are limited between a left-most pixel and a right-most pixel. The position of the new pixel in the region is indicated by a distance from the right-most pixel as indicated in an arrow shown in FIG. 14. Therefore, the position of the new pixel can be defined by an arbitrary integer 1 to M.

Figure 14:
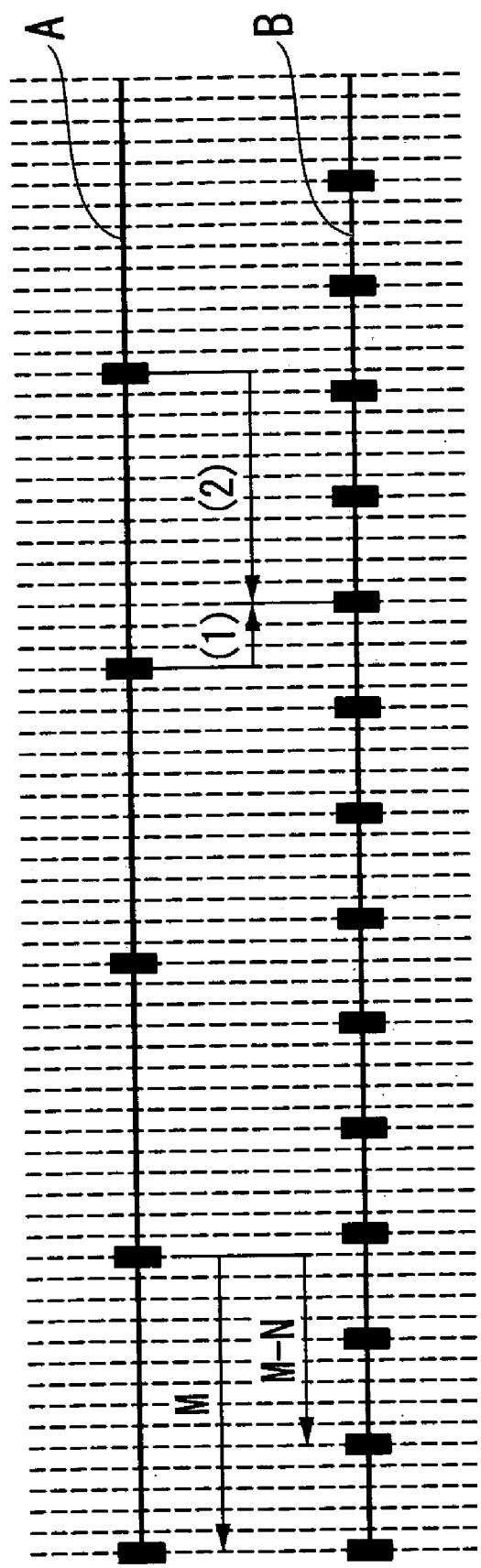
FIG. 14 is a view for explaining details of operations conducted in the region determining section.

As shown in FIG. 14, the position of a first new pixel coincides with a position of the pixel of the original image. In accordance with the above definition, the position of the first new pixel is indicated by M.

A second new pixel is disposed to the right of the first new pixel by N virtual sections. Therefore, the position of the second new pixel is defined by M−N.

Positions of the new pixels thereafter are calculated by reducing N from an integer indicating a position of the currently newest pixel. However, the position of the pixel is indicated by 0 (zero) or less, i.e., a negative integer if the reduction is repeated several times. This situation is indicated by an arrow (1) in FIG. 14. This situation indicates that the integer, indicating the region of the original image, is greater than an integer indicating the region in which the new pixel will be generated. In such a case, it is possible to remedy the situation as shown by an arrow (2) by adding an integer M; thus, the position of the new pixel is shown properly.

If the integer, indicating the position of a pixel, is indicated by 0 (zero) or by a lower number, the position of the new pixel needs to be shifted from a next region. The position of a pixel can be indicated properly by adding an integer M to an integer indicating a position of a currently-newest pixel.

If N is greater than M, the position of the pixel is still 0 or less after the above shifting. In such a case, new pixels are not disposed in the shifted region. Also, in this case, the position of the new pixel is not calculated with respect to the shifted region. That is, the region is shifted again.

The region determining section 102 is explained in detail with reference to FIG. 13.

The region determining section 102 includes a first calculating circuit 301 for generating the region control signals S21 used with respect to the horizontal direction and a second calculating circuit 306 for generating region control signals S22 used with respect to the vertical direction.

The first calculating circuit 301 is explained as follows.

The first calculating circuit 301 is a block operated in accordance with the magnification/scale-reduction ratio with respect to the horizontal direction and a clock indicated by a horizontal effective period. The first calculating circuit 301 generates: region control signals S21, i.e., horizontal region movement command signals S211 for shifting the regions in which the new pixels will be disposed with respect to the horizontal direction; and horizontal deletion region signals S212 indicating regions in which new pixels do not need to be generated.

The first calculating circuit 301 includes comparators 302 and 304, a substractor 303, and an adder 305.

The comparator 302 generates reduction non-authorization signals and outputs them to the substractor 303 disposed thereoutside. If a parameter HC outputted from the adder 305 indicates 0 (zero) or less, the reduction non-authorization signals are active. The reduction non-authorization signals are outputted as horizontal deletion region signals for indicating whether or not new pixels will be disposed in the regions. The parameter HC is also inputted to the substractor 303 without being modified.

The substractor 303 outputs a parameter HA, indicating a value, calculated by reducing an integer denominator of the magnification ratio with respect to the horizontal direction from the parameter HC when the reduction non-authorization signals are inactive. The magnification data, i.e., integer denominator and integer numerator of the magnification ratio with respect to the horizontal direction, inputted parameter HC, the horizontal effective signal, the reduction non-authorization signals, and clock signals are innputted to the substractor 303. The substractor 303 is operated with respect to the inputted signal clock. The horizontal effective signals, based on horizontal synchronous signals, are generated by adding delays to sections corresponding to signals to convert the resolution.

The substractor 303 sets an integer numerator as an initial value while the horizontal effective signals are invalid and outputs the initial value as the parameter HA. As long as the horizontal effective signals are valid and the reduction non-authorization signals are inactive, the substractor 303 outputs a value, i.e., the parameter HA, calculated by subtracting the integer denominator from the parameter HC. On the other hand, if the reduction non-authorization signals are active, the reduction does not occur. That is, the substractor 303 outputs the parameter HC without modifying the parameter HA.

The comparator 304 generates addition authorization signals from the parameter HA and outputs the generated signals to the adder 305 disposed next. If the parameter HA is 0 (zero) or less, the addition authorization signals are active. The addition authorization signals are also outputted as horizontal region movement command signals S211 for indicating whether or not the regions, in which the new pixels will be disposed, are shifted. The parameter HA is also inputted to the adder 305 without being modified.

The adder 305 outputs the parameter HC, calculated by adding the integer numerator of the magnification ratio with respect to the horizontal direction, to the parameter HA. If the addition authorization signals are inactive, the adder 305 outputs the parameter HC without modifying the parameter HA.

The second calculating circuit 306 is explained as follows.

The second calculating circuit 306 is a block operated in accordance with the magnification/scale-reduction ratio with respect to the vertical direction. The second calculating circuit 306 is operable when a horizontal line of the horizontal effective period is completed. The second calculating circuit 306 generates: a region control signals S22, i.e., vertical region movement command signals S221 for shifting the regions in which the new pixels will be disposed with respect to the vertical direction; and a vertical deletion region signals S222 indicating regions in which new pixels are not necessary to be generated.

The second calculating circuit 306 has almost the same structure as that of inhe first calculating circuit 301. The second calculating circuit 306 includes comparators 307 and 309, a substractor 308, and an adder 310.

The comparator 307 generates reduction non-authorization signals and outputs the generated signals to the substractor 308 disposed thereoutside. If a parameter VC outputted from the adder 310 indicates 0 (zero) or less, the reduction non-authorization signals are active. The reduction non-authorization signals are outputted as vertical deletion region signals S222 for indicating whether or not new pixels will be disposed in the regions. The parameter VC is also inputted to the substractor 308 without being modified.

The substractor 308 outputs the parameter VA calculated by subtracting the integer denominator of the magnification ratio with respect to the vertical direction from the parameter VC. The magnification data, i.e., integer denominators and integer numerator of the magnification ratio with respect to the vertical direction, inputted parameter VC, the vertical effective signals, the reduction non-authorization signals, line end signals, and clocks are inputted to the substractor 308. The substractor 308 outputs the parameter VA every one line with respect to the horizontal direction. The vertical effective signals, based on vertical synchronous signals, are generated by adding delays to sections corresponding to signals to convert the resolution.

The substractor 308 sets an integer numerator as an initial value while the vertical effective signals are invalid and outputs the initial value as the parameter VA. As long as the vertical effective signals are valid and the reduction non-authorization signals are inactive, the substractor 308 outputs a value, i.e., a parameter VA, calculated by subtracting the integer denominator from the parameter VC. On the other hand, if the reduction non-authorization signals are active, the reduction does not occur. That is, the substractor 308 outputs the parameter VC without modifying the parameter VA.

The comparator 309 generates addition authorization signals from the parameter VA and outputs the generated signals to the adder 310. If the parameter VA is 0 (zero) or less, the addition authorization signals are active. The addition authorization signals are also outputted as vertical region movement command signals S221 for indicating whether or not the regions, in which the new pixels will be disposed, are shifted. The parameter VA is also inputted to the adder 310 without being modified.

The adder 310 outputs the parameter VC, calculated by adding the integer numerator of the magnification ratio with respect to the horizontal direction, to the parameter VA. If the addition authorization signals are inactive, the adder 310 outputs the parameter VC without modifying the parameter VA.

Operations of the first calculating circuit 301 are explained as follows. In the following explanations, magnification ratio for the enlargement is 11/9, and magnification ratio for reducing the scale is 5/8. The second calculating circuit 306 is different from the first calculating circuit 301 in that the second calculating circuit 306 calculates the pixel values line by line. Therefore, explanation of the second calculating circuit 306 is omitted.

The enlargement by the magnification ratio of 11/9 is explained.

When the first clock signal is generated, the horizontal effective signal is invalid. The clock signal generated subsequently are valid. A predetermined period, in which signals are outputted from the substractor 303 return to the substractor 303 again, is one clock.

In the substractor 303, an initial value 11 is set. The substractor 303 outputs the initial value 11.

The initial value 11 does not indicate a value less than 0 (zero); therefore, the comparator 304 outputs an inactive addition authorization signal.

The outputted addition authorization signal is inactive; therefore, the adder 305 outputs the initial value 11 without modifying it.

The initial value 11 does not indicate a value less than 0 (zero); therefore, the comparator 302 outputs an inactive reduction non-authorization signal.

The outputted reduction non-authorization signal is inactive; therefore, the substractor 303 outputs 2 by subtracting 9 from 11.

The initial value 2 does not indicate a value less than 0 (zero); therefore, the comparator 304 outputs an inactive addition authorization signal.

The outputted addition authorization signal is inactive; therefore, the adder 305 outputs the initial value 2 without modifying it.

The initial value 2 does not indicate a value less than 0 (zero); therefore, the comparator 302 outputs an inactive reduction non-authorization signal.

The outputted reduction non-authorization signal is inactive; therefore, the substractor 303 outputs −7 by subtracting 9 from 2.

The initial value −7 is less than 0 (zero); therefore, the comparator 304 outputs an active addition authorization signal.

The outputted addition authorization signal is active; therefore, the adder 305 outputs 4 by adding 11 to −7.

The initial value 4 does not indicate a value less than 0 (zero); therefore, the comparator 302 outputs an inactive reduction non-authorization signal.

The outputted reduction non-authorization signal is inactive; therefore, the substractor 303 outputs −0.5 by subtracting 9 from 4.

The outputted value −5 is less than 0 (zero); therefore, the comparator 304 outputs an active addition authorization signal.

The outputted addition authorization signal is active; therefore, the adder 305 outputs 6 by adding 11 to −5.

The same operations are repeated.

The outputted values from the adder 305 are 2, 4, 6, 8, 10, 1, 3, 5, 7, 9, and 11 with respect to the clock signal after the horizontal effective signal is valid. Thus, 11 clock signals indicate one routine of the outputted values. The addition authorization signals are inactive in a first clock in which 2 is outputted and in a sixth clock in which 1 is outputted. Also, the horizontal region movement command signal S211 is inactive. In such a case, a region in which new pixel is generated is not shifted. That is, new pixels are generated in one region twice. On the other hand, the reduction non-authorization signals are always inactive. Also, the horizontal deletion region signals S212 are inactive. Therefore, the new pixels need to be disposed in every region.

The scale-reduction of 5/8 is explained as follows.

In the substractor 303, an initial value 5 is set. The substractor 303 outputs the initial value 5.

The initial value 5 does not indicate a value less than 0 (zero); therefore, the comparator 304 outputs an inactive addition authorization signal.

The outputted addition authorization signal is inactive; therefore, the adder 305 outputs the initial value 5 without modifying it.

The initial value 5 does not indicate a value less than 0 (zero); therefore, the comparator 302 outputs an inactive reduction non-authorization signal.

The outputted reduction non-authorization signal is inactive; therefore, the substractor 303 outputs −3 by subtracting 8 from 5.

The outputted value −3 is less than 0 (zero); therefore, the comparator 304 outputs an active addition authorization signal.

The outputted addition authorization signal is active; therefore, the adder 305 outputs 2 by adding 5 to −3.

The initial value 2 does not indicate a value less than 0 (zero); therefore, the comparator 302 outputs an inactive reduction non-authorization signal.

The outputted reduction non-authorization signal is inactive; therefore, the substractor 303 outputs −6 by subtracting 8 from 2.

The outputted value −6 is less than 0 (zero); therefore, the comparator 304 outputs an active addition authorization signal.

The outputted addition authorization signal is active; therefore, the adder 305 outputs −1 by adding 5 to −6.

The outputted value −1 is less than 0 (zero); therefore, the comparator 302 outputs an inactive reduction non-authorization signal.

The outputted reduction non-authorization signal is active; therefore, the substractor 303 outputs −1 without modifying it.

The outputted value −1 is less than 0 (zero); therefore, the comparator 304 outputs an active addition authorization signal.

The outputted addition authorization signal is active; therefore, the adder 305 outputs 4 by adding 5 to −1.

The same operations are repeated.

The outputted values from the adder 305 are 2, −1, 4, 1, −2, 3, 0, and 5 with respect to the clock signal after the horizontal effective signal is valid. Thus, 8 clocks indicate one routine of the outputted values. However, it is possible to understand that 5 clocks indicate one routine of the outputted values except when the horizontal deletion region signal S212 is active. The reduction non-authorization signals are active in, a third clock in which −1 is outputted, a sixth clock in which −2 is outputted, and an eighth clock in which 0 is outputted. Also, the horizontal deletion region signal S212 is active. In such a case, a new pixel is not necessary to be generated in the region. On the other hand, the addition authorization signals are always active, and the horizontal region movement command signals S211 are also active. Therefore, pluralities of new pixels are not generated in a region.

Data, i.e., magnification/scale-reduction ratios are set by the CPU and set in registers. Also, signals supplied from a device, i.e., a timing generator, can be used for the horizontal effective signals, vertical effective signals, and the line end signals. Frequency of the clock signal is not limited to a particular range as long as the circuits are properly operable.

The region control signals S2 are generated by adding or subtracting data relating to the magnification ratio, i.e., the denominator and the numerator of the magnification ratio with respect to the horizontal direction, and the denominator and the numerator of the magnification ratio with respect to the vertical direction in the first calculating circuit 301 and the second calculating circuit 306. Also, the region control signals S2 may be generated by processors, i.e., a CPU or DSP (Digital Signal Processor) having predetermined programs therein.

Figure 15:
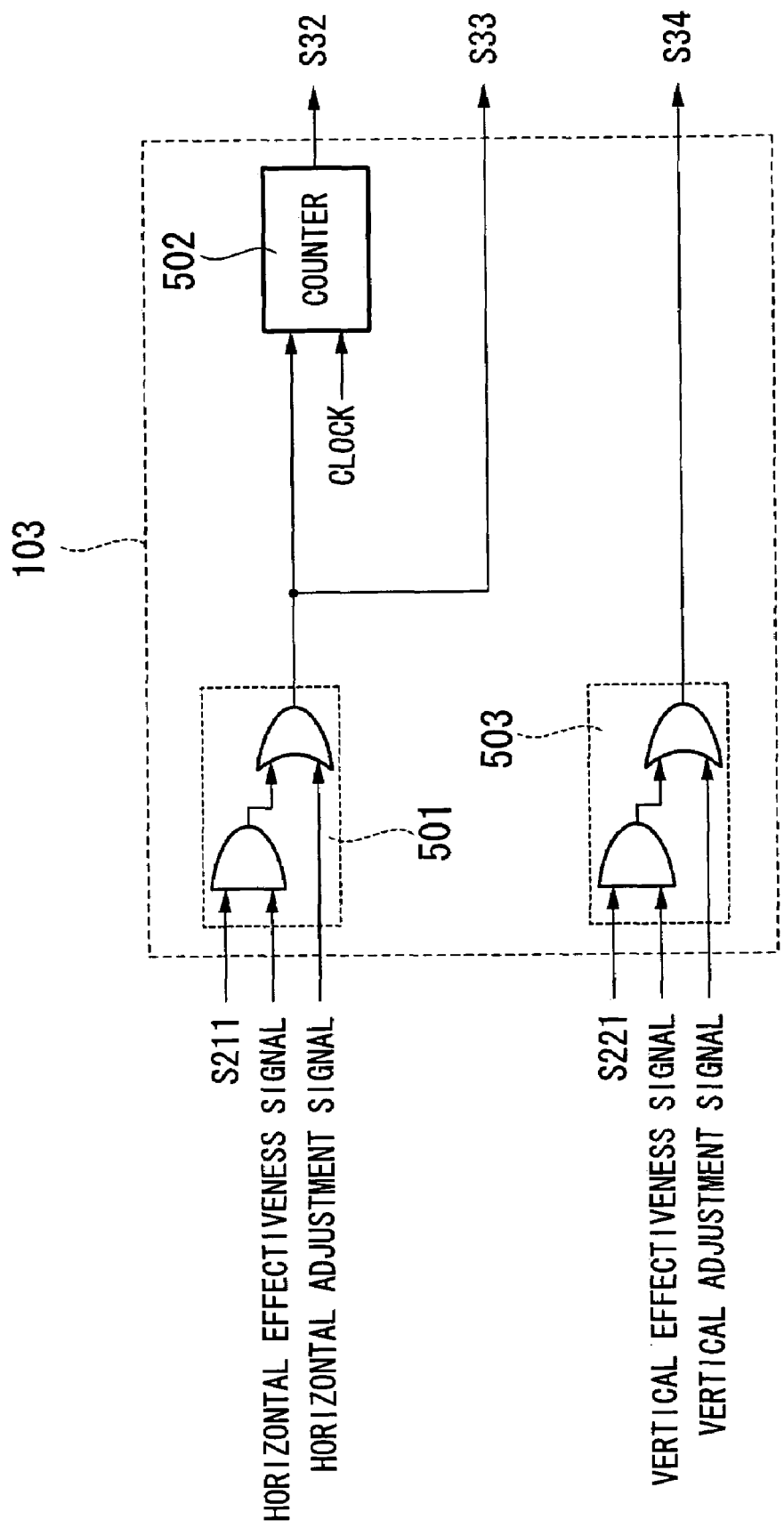
FIG. 15 is a schematic diagram of the pixel value read-out controlling section.

FIG. 15 is a schematic diagram of a pixel value read-out controlling section 103.

The pixel value read-out controlling section 103 shown in FIG. 15 includes a logic-adjusting circuit 501 with respect to the horizontal direction, a counter 502 for counting the signals outputted from the logic-adjusting circuit 501, and a logic-adjusting circuit 503 with respect to the vertical direction.

Signals generated by the pixel value read-out controlling section 103, i.e., read-out control signals S32, register data shift control signals S33, and line memory data shift control signals S31, correspond to horizontal region movement command signals S211 outputted during the horizontal effective period from the region determining section 102, and vertical region movement command signals S221 outputted from the region determining section 102 during the vertical effective period. Adjustments so that the interpolation is not calculated for some regions, i.e., marginal sections of the image. The logic-adjusting circuits 501 and 503 handle the above adjustments. More specifically, the logic-adjusting circuits 501 and 503 adjust the horizontal region movement command signals S211 and the vertical region movement command signals S221 using horizontal adjusting signals and vertical adjusting signals. The horizontal adjusting signals and the vertical adjusting signals are generated based on signals, i.e., the signals indicating horizontal sync. pulse and the signals indicating vertical sync. pulse in consideration of the regions for which interpolation is calculated.

Signals outputted from the logic-adjusting circuit 501 are register data shift control signals S33. Also, the register data shift control signals S33 are inputted into the counter 502. If the inputted signals S33 are active, the counter 502 counts up. Signals outputted from the counter 502 are address values, i.e., the read-out control signals S32 read by the line memory.

The signals outputted from the logic-adjusting circuit 503 are line memory data shift control signals.

Only major control signals, i.e., for reading the pixel values, are shown in the explanation of the present invention. For example, explanations for the signals, i.e., read-enabling signals, are omitted.

FIG. 16 is a schematic diagram showing the interpolation-calculating section 104. With respect to this drawing, the abbreviation, "H1CA", indicates a horizontal first coefficient A. Also, the abbreviation "V4CB" indicates a vertical fourth coefficient B. In the drawing, the interpolation-calculating section 104 can select interpolation method A or B so that the interpolation coefficients, i.e., horizontal coefficients A and vertical coefficients B are selected by selector group 609, and thereby outputted.

For the purpose of better understanding the signals inputted/outputted, in FIG. 16, the interpolation-calculating section 104 is divided into three sections, i.e., a circuit for outputting the horizontal interpolation coefficients, a circuit for outputting the vertical interpolation coefficients, and a circuit for calculating the interpolation of the new pixel values in accordance with the outputted horizontal interpolation coefficients, the outputted vertical interpolation coefficients, and the 16 pixels D11 to D44 of the original image outputted from the pixel storage section 101.

The interpolation-calculating section 104 includes: a first interpolation coefficient read-out controlling section having a count-up/down circuit 601 and a determiner 602; a first interpolation coefficient storage section including an SRAM group 603; an interpolation coefficient switching section including a selector group 604; a second interpolation coefficient read-out controlling section including a count up/down circuit 605 and a determiner 606; a second interpolation coefficient storage section including an SRAM group 607; a second interpolation coefficient switching section including selector group 608; a coefficient selecting section including a selector group 609; and a pixel value calculating section including adders 610 and 613, and a multiplier 612.

The count up/down circuit 601 is operated by the clock signals and generates SRAM reading addresses. The initial value of the SRAM reading addresses is 0 (zero) so that the horizontal effective signals are valid when the new pixels are generated with respect to the horizontal direction, and the counting up and the counting down are repeated when the horizontal deletion region signals S212 are inactive. The counting up or the counting down is selected in accordance with the signals, for indicating the counting up or the counting down, outputted from the determiner 602.

The determiner 602 outputs signals for counting up or counting down for determining whether the SRAM reading addresses outputted from the count up/down circuit 601 will be counted up or counted down, in accordance with the values corresponding to the numerators indicating the magnification ratio with respect to the horizontal direction. A maximum value of the signal for the counting up is indicated by the numerator of the magnification ratio with respect to the horizontal direction of which a least-significant bit is cut off. The signals generated by the count up/down circuit 601 for the counting up/down are generated so that the SRAM reading addresses are in a range between 0 (zero) and the maximum value.

If the least-significant bit is indicated by "1 (one)", the determiner 602 instructs the count up/down circuit 601 to count down after repeating the maximum value twice. The SRAM reading address circulate in a cycle having arbitrary steps starting from zero. In this cycle, the steps are indicated by arbitrary integers. Number of the steps indicates the magnification ratio with respect to the horizontal direction; thus, such indicated numerator serves for determining the position of the new pixels in the region with respect to the horizontal direction.

The interpolation coefficients necessary for calculating the interpolations with respect to the horizontal direction are stored in the SRAM group 603 in advance in accordance with the magnification/scale-reduction ratio. In the case of 16-point interpolation, 4 interpolation coefficients are necessary with respect to each interpolation method with respect to the horizontal direction. In the present invention, there are two interpolation methods, i.e., A and B; therefore, eight SRAMs are disposed. The quantity of the SRAMs can be changed if a plurality of coefficient types are stored in a common SRAM.

The interpolation coefficients are stored in addresses in a range of 0 (zero) to the maximum value taking advantage of the above explained symmetry of the interpolation coefficients. The stored interpolation coefficients depend on the SRAM reading address outputted from the count up/down circuit 601.

The selector group 604 switches four interpolation coefficients outputted from the SRAM group 603 in accordance with symmetry of the interpolation coefficients. More specifically, if the signals outputted from the determiner 602 indicates "up", coefficients with respect to the horizontal direction are used, in order of, from left to right in the drawings, first horizontal coefficient, second horizontal coefficient, third horizontal coefficient, and fourth horizontal coefficient. In contrast, if the signals outputted from the determiner 602 indicates "down", coefficients with respect to the horizontal direction are used, in order of, from left to right in the drawings, the fourth horizontal coefficient, the third horizontal coefficient, the second horizontal coefficient, and the first horizontal coefficient. That is, the selector group switches the order for using the coefficients use for calculating the interpolations.

The count up/down circuit 605 generates the SRAM reading addresses after every horizontal line is interpolated. The initial value of the SRAM reading addresses is 0 (zero) so that the vertical effective signals are valid when the new pixels are generated with respect to the vertical direction, and the counting up and the counting down are repeated when the vertical deletion region signals S222 are inactive. The counting up or the counting down is selected in accordance with the signals for indicating the counting up or the counting down outputted from the determiner 606.

The determiner 606 outputs signals for counting up or counting down for determining whether the SRAM reading addresses outputted from the count up/down circuit 605 will be counted up or counted down, in accordance with the values corresponding to the numerators indicating the magnification ratio with respect to the vertical direction. A maximum value of the signal for the counting up is indicated by the numerator of the magnification ratio with respect to the vertical direction of which a least-significant bit is cut off. The signals generated by the count up/down circuit 605 for the counting up/down are generated so that the SRAM reading addresses are in a range between 0 (zero) and the maximum value.

If the least-significant bit is indicated by "1 (one)", the determiner 602 instructs the count up/down circuit 601 to count down after repeating the maximum value twice. The SRAM reading address circulate in a cycle having arbitrary steps starting from zero. In this cycle, the steps are indicated by arbitrary integers. Number of the steps indicates the magnification ratio with respect to the horizontal direction; thus, such indicated numerator serves for determining the position of the new pixels in the region with respect to the horizontal direction.

The interpolation coefficients necessary for calculating the interpolations with respect to the vertical direction are stored in the SRAM group 607 in advance in accordance with the magnification/scale-reduction ratio. In the case of 16-point interpolation, 4 interpolation coefficients are necessary with respect to each interpolation method with respect to the vertical direction. In the present invention, there are two interpolation methods, i.e., A and B; therefore, eight SRAMs are disposed. The quantity of the SRAMs can be changed if a plurality of coefficient types are stored in a common SRAM.

The interpolation coefficients are stored in addresses in a range of 0 (zero) to the maximum value taking advantage of the above explained symmetry of the interpolation coefficients. The stored interpolation coefficients depend on the SRAM reading address outputted from the count up/down circuit 605.

The selector group 608 switches four interpolation coefficients outputted from the SRAM group 607 in accordance with symmetry of the interpolation coefficients. More specifically, if the signals outputted from the determiner 606 indicates "up", coefficients with respect to the vertical direction are used, in order of from up side to down side in the drawing, first vertical coefficient, second vertical coefficient, third vertical coefficient, and fourth vertical coefficient. In contrast, if the signals outputted from the determiner 602 indicates "down", coefficients with respect to the vertical direction are used, in order of, from up side to down side in the drawing, the fourth vertical coefficient, the third vertical coefficient, the second vertical coefficient, and the first vertical coefficient. That is, the selector group switches the order for using the coefficients use for calculating the interpolations.

The methods explained above are for reducing the necessary memory capacity by half used in the SRAMs for storing the interpolation coefficients with respect to the horizontal and the vertical direction. Also, a method may be realized in which the interpolation coefficients, stored in the SRAMs and corresponding to all the patterns of the positions of the new pixels in the region in which the new pixels will be disposed, are read. In this case, the count up/down circuit repeats a zero-reset and counting up. In this case, the function for reversing the disposition order of the interpolation coefficients is not necessary, and the memory capacity in the SRAMs is twice as large as that in the non-symmetry memory structure.

The selector group 609 selects interpolation method A or B so that the interpolation method is selected by selecting signals generated based on a distribution of the 16 pixel values in the pixel group of the original image surrounding the region in which the new pixels will be disposed.

The multipliers 610 and 612, and the adders 611 and 613 calculate the pixel values of the new pixels from 4 of the horizontal interpolation coefficients, 4 of the vertical interpolation coefficients, and the 16 pixel values of the original image, i.e., D11, D12, D13, D14, D21, D22, D23, D24, D31, D32, D33, D34, D41, D42, D43, and D44.

Figure 17:
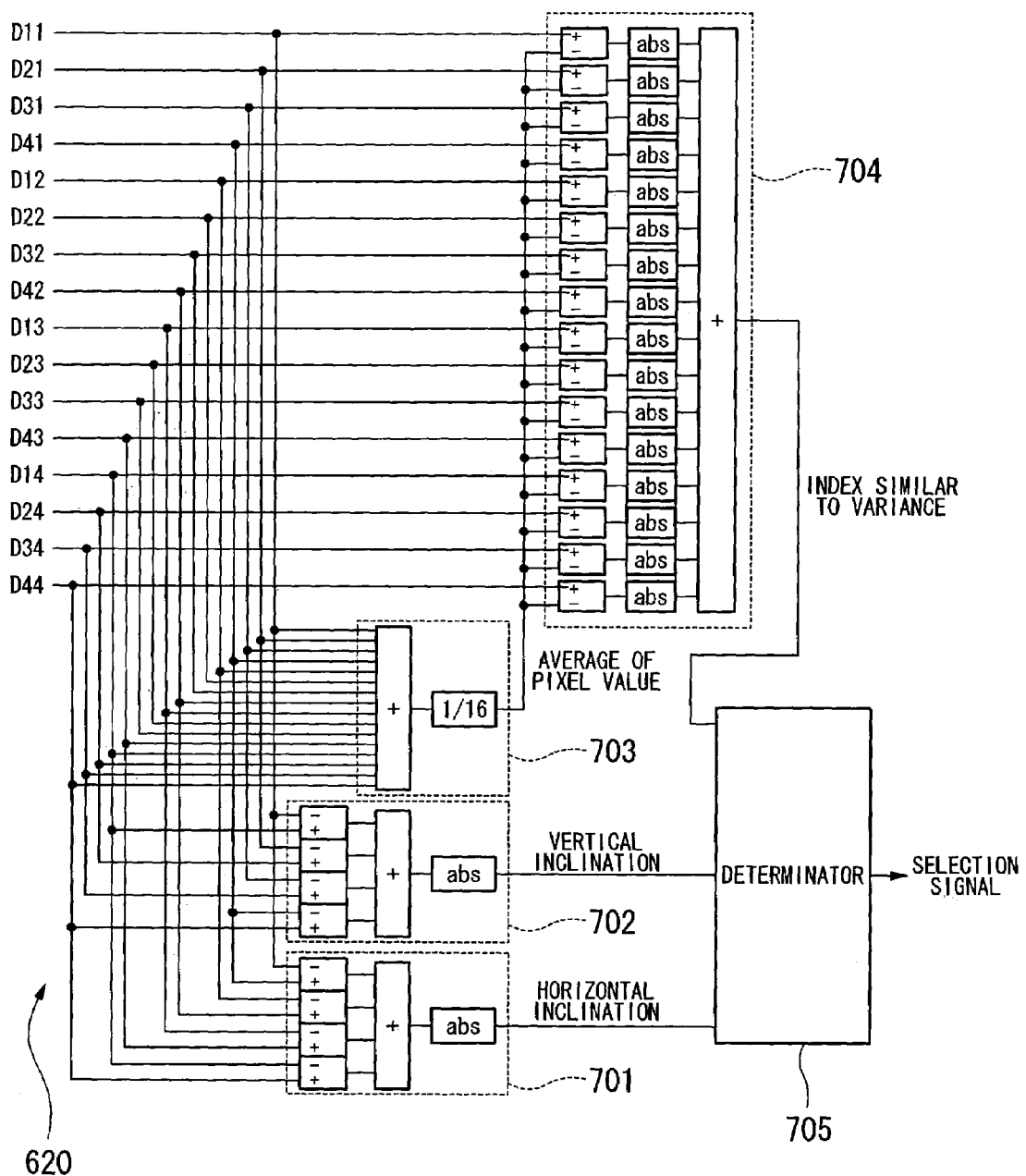
FIG. 17 is a schematic diagram of the image concentration determining section, disposed in the interpolation-calculating section, for supplying selection signals to each selector.

FIG. 17 is a schematic diagram of the image concentration determining section 620 disposed in the interpolation-calculating section 104, for supplying selection signals to the selector group 609.

The image concentration determining section 620 shown in FIG. 17 includes: horizontal inclination calculating section 701; a vertical inclination calculating section 702; a section 703 for calculating average pixel values; a variance calculator 704; and a determiner 705. The pixel values D11 to D44 of the original image stored in the pixel value storage section 101 are inputted to the image concentration determining section 620.

The horizontal inclination calculating section 701 includes four sets of differential detector, an adder, and an absolute value circuits. The horizontal inclination calculating section 701 calculates differences between the values of the left-most pixel among 16 pixels having 4×4 disposition and the values of the right-most pixel. After that, the horizontal inclination calculating section 701 addes the calculated differences, and thereby determines an absolute value of the added differences.

The vertical inclination calculating section 702 includes four sets of differential detectors, an adder, and absolute value circuits. The vertical inclination calculating section 702 determines vertical inclinations by calculating an absolute value of a sum of differences of the pixel value of the uppermost pixel and the pixel value of the corresponding bottom pixel disposed in the pixel group including 16 pixels disposed in a 4×4 disposition and surrounding the region in which the new pixels will be disposed, and by calculating the absolute value of a difference between the pixel value of the uppermost pixel and the pixel value of the corresponding bottom pixel. More specifically, the vertical inclination calculating section 702 calculates the vertical inclination:

|(D11−D41)+(D12−D42)+(D13−D43)+(D14−D44)|.

The section 703 for calculating average pixel values includes an adder and a 1/16 multiplier for calculating an average of the pixel values in the pixel group having 16 pixels surrounding the region in which the new pixels will be disposed.

The variance calculator 704 includes 16 sets of differential detector 16 sets of absolute value circuits, and an adder. The variance calculator 704 calculates an index similar to a variance by calculating differences between pixel values of 16 pixels surrounding the region in which the new pixels will be disposed and the above calculated averages, adding the calculated differences, and thereby determining an absolute value of the added differences.

The determiner 705 determines the concentration properties of the original image in accordance with results by comparing the horizontal inclination outputted from the horizontal inclination calculating section 701, the vertical inclination outputted from the vertical inclination calculating section 702, and the index similar to a variance outputted from the variance calculator 704 with corresponding thresholds respectively. The determiner 705 outputs selecting signals for selecting the interpolating method in accordance with the determined results.

As explained above, examples for selecting the interpolating method in accordance with the value similar to variance, and inclinations are shown. It is also possible to use edge detection results, variances, and deviations for the selecting of the interpolating method.

In the first embodiment, the SRAM reading addresses are generated by using the count up/down circuit 601 for the pixels disposed with the horizontal direction and the count up/down circuit 605 for the pixels disposed with respect to the vertical direction. In the present invention, the count up/down circuits 601 and 605 may be omitted.

A modified example in which the count up/down circuits 601 and 605 are omitted is explained with reference to the above explained first embodiment.

A parameter HC outputted from the first calculating circuit 301 is used for the pixels disposed with respect to the horizontal direction. A parameter VC outputted from the second calculating circuit 306 is used for the pixels disposed with respect to the vertical direction. These parameters HC and VC are used for the SRAM reading addresses.

The range of the values generated by the count up/down circuit 601 and the range of the parameters HC generated by the count up/down circuit 605 are the same. Also, the timings in which these values vary are the same. However, the ranges of the values are different at certain timings. Therefore, the relationships between the addresses and the data stored in the SRAM group 603 may have to be changed from those shown in the first embodiment. The range of the values generated by the count up/down circuit 605 and the range of the parameters VC generated by the second count up/down circuit 306 are the same. Also, the timings at which these values vary are the same. However, the ranges of the values are different at certain timings. Therefore, the relationships between the addresses and the data stored in the SRAM group 607 may have to be changed from those shown in the first embodiment.

In order to reduce the necessary memory capacity of the SRAMs by using the symmetry of the interpolation coefficients by half, the following operations are conducted.

If the parameter HC exceeds 1/2 of the numerator of the magnification ratio with respect to the horizontal direction, a value calculated by reducing the parameter HC from the numerator is the SRAM reading address. If the parameter HC is not greater than 1/2 of the numerator of the magnification ratio with respect to the horizontal direction, the parameter HC is the SRAM reading address. If the parameter VC exceeds 1/2 of the numerator of the magnification ratio with respect to the vertical direction, a value calculated by reducing the parameter VC from the numerator is the SRAM reading address. If the parameter VC is not greater than 1/2 of the numerator of the magnification ratio with respect to the vertical direction, the parameter C is the SRAM reading address.

Second Embodiment

Figure 18:
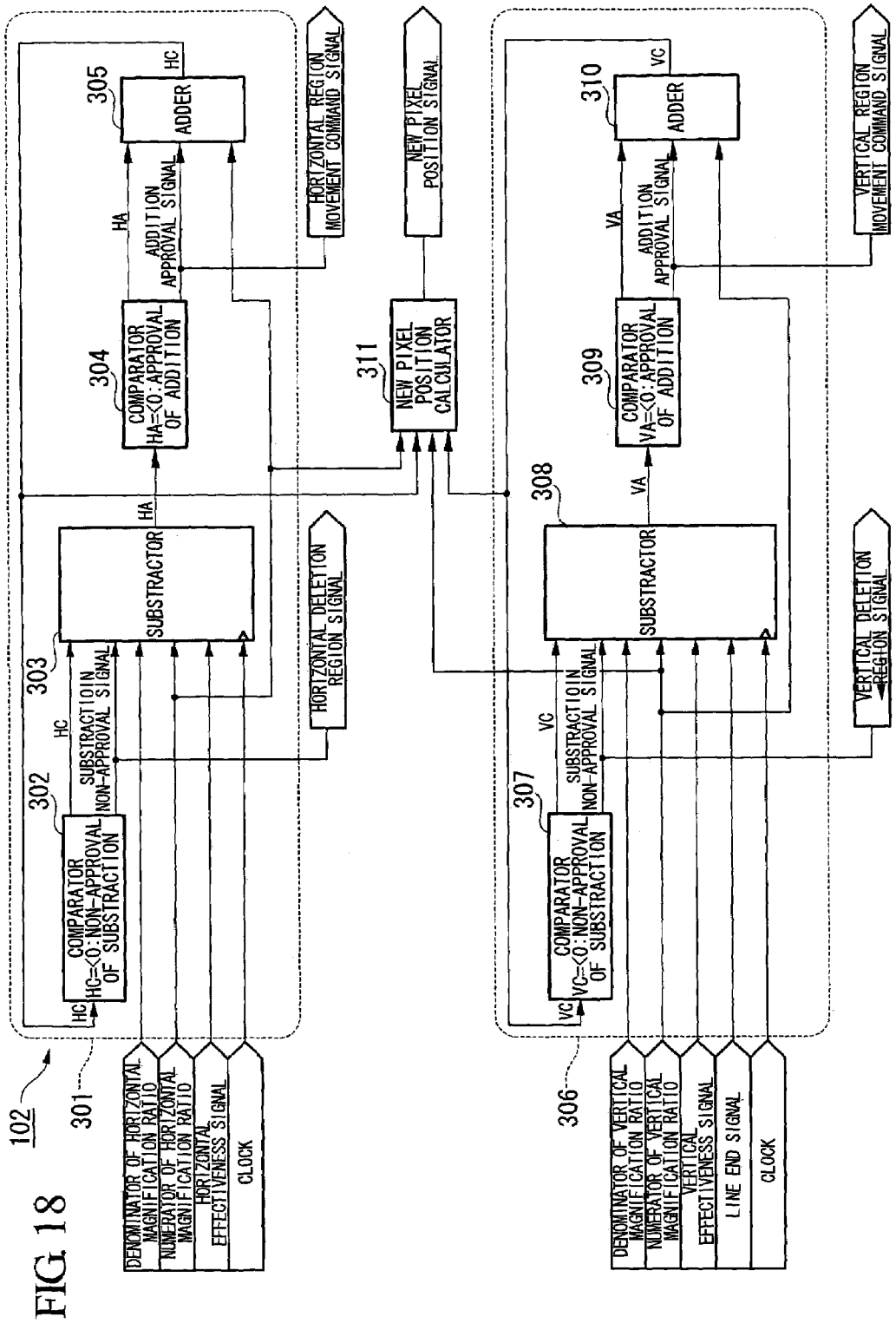
FIG. 18 is a block diagram of the region determining section.

The region determining section 102 according to a second embodiment of the present invention is explained. FIG. 18 is a block diagram of the region determining section according to the second embodiment of the present invention. The region determining section 102 according to the second embodiment is different from that of the first embodiment in that the region determining section 102 of the second embodiment has a calculator 311 for calculating positions of new pixels. Explanations for structures used commonly with the first embodiment are omitted in the explanation of the second embodiment.

The calculator 311 for calculating positions of new pixels is explained as a characteristic structure in the second embodiment. The calculator 311 for calculating positions of new pixels calculates positions of the new pixels, disposed in the regions in which the new pixels will be disposed, in accordance with the numerator of the magnification ratio with respect to the horizontal direction, the numerator of the magnification ratio with respect to the vertical direction, and the parameters HC and VC and outputs the calculated positions as signals for indicating positions of the new pixels. When new pixels are generated based on the 16 pixels disposed in a 4×4 disposition of the original image, the new pixels are disposed in a region surrounded by 4 pixels D22, D23, D32, and D33. In this surrounded region, the calculator 311 for calculating position of new pixels calculates an internal dividing ratio for dividing the corresponding horizontal line segment and the corresponding vertical line segment.

The internal dividing ratio with respect to the horizontal direction is indicated by the ratio (numerator of the magnification ratio with respect to the horizontal direction)−(parameter HC):HC. The internal dividing ratio with respect to the vertical direction is indicated by the ratio (numerator of the magnification ratio with respect to the vertical direction)−(parameter VC):VC. The calculator 311 for calculating positions of new pixels includes a substractor for calculating the above ratios. The signals for indicating positions of the new pixels are supplied to the interpolation-calculating section 104 as a source for generating the interpolation coefficients.

With respect to the magnification ratio of 11/9 as explained above, the internal dividing ratios, calculated by the calculator 311 for calculating positions of new pixels with respect to the horizontal direction and to the vertical direction, are 0:11, 9:2, 7:4, 5:6, 3:8, 1:10, 10:1, 8:3, 6:5, 4:7, 2:9, etc.; therefore, the new pixels are generated in the positions shown in FIG. 6. With respect to the scale-reduction ratio of 5/8 as explained above, the internal dividing ratios, calculated by the calculator 311 for calculating positions of new pixel with respect to the horizontal direction and to the vertical direction, are 0:5, 3:2, 1:4, 4:1, 2:3, etc.; therefore, the new pixels are generated in the positions shown in FIG. 7. In the case of scale-reduction, the parameters HC or VC may be negative values at times. In this case, the horizontal deletion region signals and the vertical deletion region signals are active; thus, it is not necessary to generate new pixels. Therefore, the parameters HC or VC are not considered for generating the internal ratios according to which the new pixels are generated.

The pixel value read-out controlling section 103 in the second embodiment is the same as that in the first embodiment. Therefore, the explanations for the pixel value read-out controlling section 103 of the second embodiment are omitted.

Figure 19:
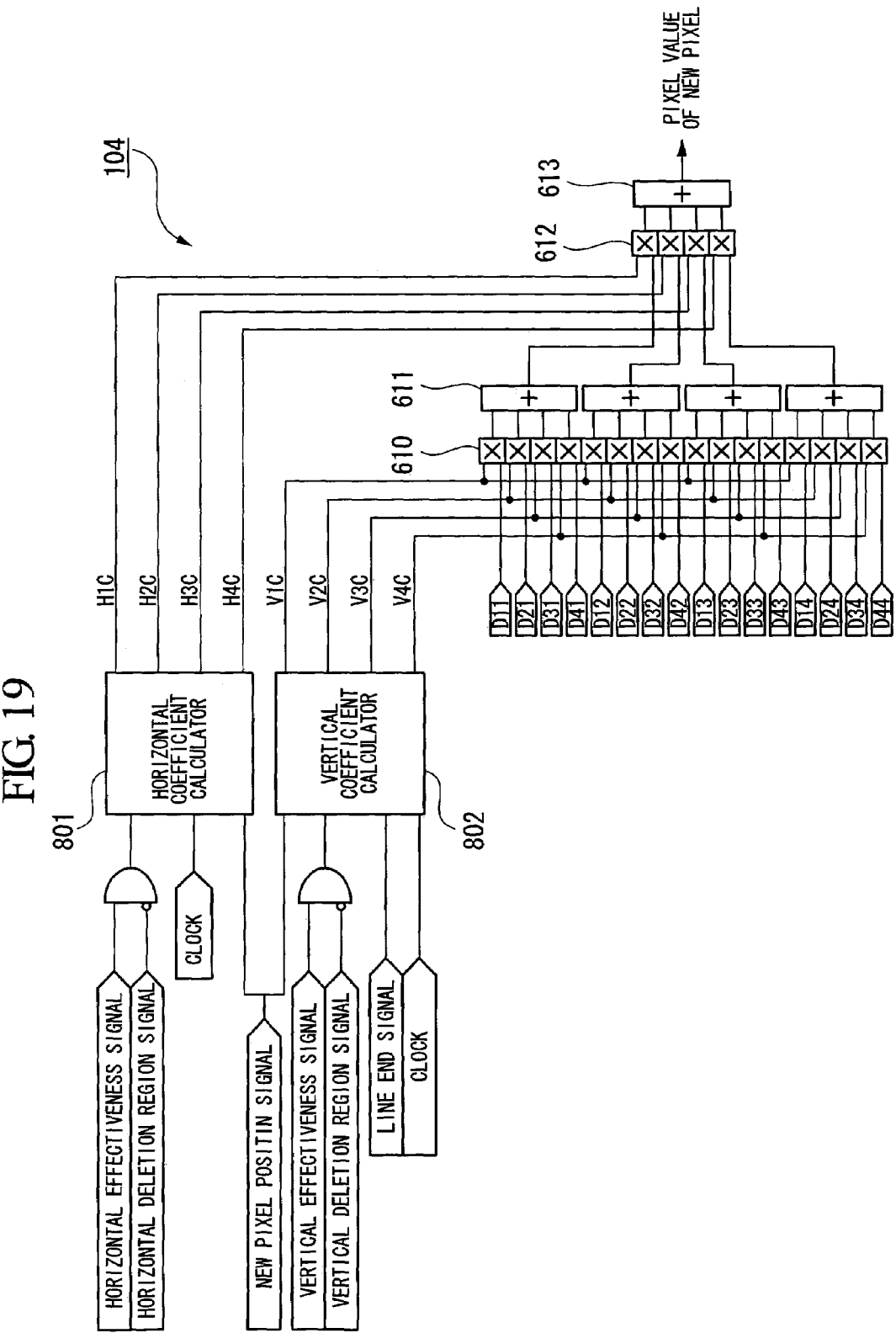
FIG. 19 is a block diagram of the interpolation-calculating section 104.

The second calculating circuit 104 according to the second embodiment is explained as follows. FIG. 19 is a schematic diagram showing the interpolation-calculating section 104. With respect to this drawing, the abbreviation, "H1CA" indicates a horizontal first coefficient A. Also, the abbreviation "V4CB" indicates a vertical fourth coefficient B. A horizontal coefficient calculating section 801 is operated by the clock signal when the horizontal effective signals are active and the horizontal deletion region signals are inactive. The horizontal coefficient calculating section 801 calculates and outputs horizontal interpolation coefficients, i.e., first to fourth horizontal coefficients in accordance with the internal dividing ratios of the new pixels disposed with respect to the horizontal direction included in the signals for indicating positions of the new pixels. In this calculation, distances of the 4 pixels disposed with respect to the horizontal direction and the corresponding new pixels may be calculated, and coefficients to be multiplied with the 4 pixels may be calculated in accordance with the calculated distances. Alternatively, pre-calculated coefficient values are stored in memory and the stored values may be read in accordance with the internal dividing ratios with respect to the horizontal direction.

A vertical coefficient calculating section 802 is operated by the clock signal when the vertical effective signals are active and the vertical deletion region signals are inactive. The vertical coefficient calculating section 802 calculates and outputs vertical interpolation coefficients, i.e., first to fourth vertical coefficients in accordance with the internal dividing ratios of the new pixels disposed with respect to the vertical direction included in the signals for indicating positions of the new pixels. In this calculation, distances of the 4 pixels disposed with respect to the vertical direction and the corresponding new pixels may be calculated, and coefficients to be multiplied with the 4 pixels may be calculated in accordance with the calculated distances. Alternatively, pre-calculated coefficient values may be stored in memories and the stored values may be read in accordance with the internal dividing ratios with respect to the vertical direction.

The multipliers 610 and 612, and the adders 611 and 613 calculate the pixel values of the new pixels from 4 of the horizontal interpolation coefficients, 4 of the vertical interpolation coefficients, and the 16 pixel values of the original image, i.e., D11, D12, D13, D14, D21, D22, D23, D24, D31, D32, D33, D34, D41, D42, D43, and D44.

As explained above, the region determining section 102 according to the second embodiment determines positions of the new pixels disposed in the regions based on the resolution conversion ratio and the raster-scanned disposition order of the new pixels. The pixel values of the pixel group corresponding to the region in which the new pixels are disposed are outputted from the pixel value storage section 101 for storing the pixel values of the pixels of the original image in accordance with the above determination results and the read-out control signals generated by the pixel value read-out controlling section 103. The interpolations of the pixel values corresponding to converted resolution are calculated by the interpolation-calculating section 104 in accordance with the outputted pixel values and the positions for the new pixels in the regions.

The regions in which the newly generated pixels are disposed are determined successively in accordance with the raster-scanned order of the newly generated pixels. According to the determination results, the pixel values of the pixel group are outputted. By doing this, the pixel values of the newly generated pixels are calculated without sorting the calculated new pixels; thus, it is possible to maintain small size of the circuitry therein.

With respect to the line direction (horizontal direction), the region in which the new pixels will be disposed is determined by the first calculating circuit 301 in accordance with the resolution conversion ratio with respect to the line direction of the image. With respect to the non-line direction (vertical direction) crossing the line direction, the region in which the new pixels will be disposed is determined by the second calculating circuit 306 in accordance with the resolution conversion ratio with respect to the non-line direction of the image. By doing this, the regions in which the new pixels will be disposed are determined successively in accordance with the raster-scanned disposition order with respect to two directions, i.e., the line direction and the non-line direction.

Third Embodiment

A third embodiment of the present invention is explained. In the third embodiment, high-quality resolution conversion is enabled when the scanned pixel values generated in the image-capturing elements are inputted in interlace mode. The resolution conversion in interlace mode is explained.

FIG. 21A is a view showing line positions in the original image. In the drawing, "○" indicates lines obtained in odd fields. "●" indicates lines obtained in even fields. FIG. 21B is a view for showing positions of lines for which interpolation must be generated when the resolution is converted by a magnification ratio of 8/5 with respect to the vertical direction. FIG. 21C is a view for showing positions of lines in which interpolations of the pixel data are generated when the resolution is converted by the same magnification ratio of 8/5 in the odd fields and the even fields in the interlace mode with respect to the vertical direction as in the first embodiment.

As shown in FIG. 21C, the lines are generated with equal intervals therebetween with respect to the fields. However, the intervals among the odd fields and the even fields are not equal when the fields are synthesized. This is because the positions for generating the interpolations of the lines in the even fields are determined with reference to the positions of the lines in the even fields of the original image. As a result, the intervals between a line of the odd fields and a line of the even fields before the resolution conversion are maintained even after the resolution conversion. Therefore, it is necessary to shift the position of the interpolated line disposed first in the even fields upwardly so that the generating of the interpolated lines can be started from the positions shown in FIG. 21B.

However, in the case of conversion for increasing the resolution, if the interpolated lines of the even fields are generated in the positions shown in FIG. 21B, the positions of the first-generated interpolated lines are shifted upwardly from a starting line of the original image undesirably. Therefore, there are not enough pixels around the pixels of the original image when interpolating the lines to put them in a desirable position.

In order to adapt to this, when the resolution is converted, in particular, the interpolated lines will have to be generated while the positions of the lines are compensated for as shown in FIG. 21D. In this compensation, the position of the first lines corresponding to the original image are adjusted so as to coincide with the position of the interpolated lines generated in the resolution conversion in the even fields by shifting the first lines in the odd fields downwardly by a shifting ratio, (1-1/magnification ratio)×(an interval between the lines of the original image). That is, in an image after the resolution conversion, sections indicated by the shifting ratio, (1-1/magnification ratio)×(an interval between the lines in an upper portion of the original image), are cut off because it is not possible to calculate the interpolation of the lines in these sections. Accordingly, sections of the image after the resolution conversion corresponding to the above cut-off sections are shifted downwardly by the above shifting ratio. In the case of increasing resolution, in particular, the scale-reduction, the position of the first interpolated line in the even field is disposed lower than the position of the first line corresponding to the original image; therefore, the above explained compensation is not necessary.

Figure 20:
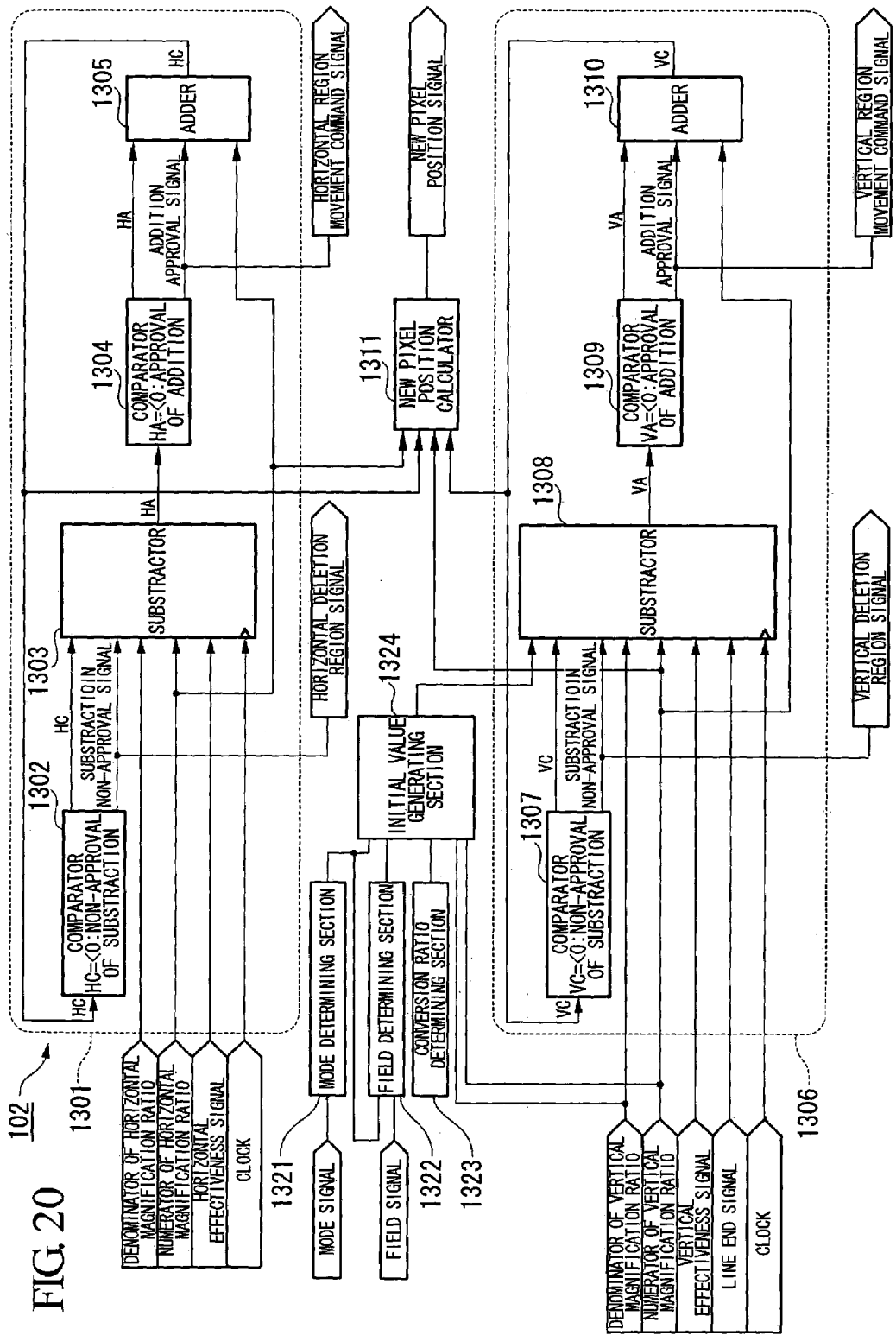
FIG. 20 is a block diagram of the region determining section according to the second embodiment of the present invention.

The structure of the image resolution converting device of the present invention is explained. FIG. 20 shows a structure in the region determining section 102 according to the present embodiment. The structure of the present embodiment is the same as that in the second embodiment except with respect to the region determining section 102. The region determining section 102 includes: a first calculating circuit 1301 for generating region control signals, i.e., horizontal deletion region signals and horizontal region movement command signals shown in the drawing, with respect to the horizontal direction; a second calculating circuit 1306 for generating region control signals, i.e., vertical deletion region signals and vertical region movement command signals shown in the drawing; a calculator 1311 for calculating positions of new pixels for outputting signals for indicating positions of the new pixels in the regions; a mode determining section 1321 for determining modes, i.e., a progressive mode, or an interlace mode; a field determining section 1322 for determining whether the mode is for the odd field or the even field in the interlace mode; a conversion ratio determining section 1323 for determining, i.e., whether the resolution conversion is a magnification or a scale-reduction, and properties in the magnification (conversion) ratio; and an initial value generating section 1324 for generating initial values sent to the second calculating circuit 1306.

The structure of the first calculating circuit 1301 is the same as that in the second embodiment; therefore, the explanations thereof are omitted. New structures added in the present embodiment are, i.e., the mode determining section 1321, the field determining section 1322, the conversion ratio determining section 1323, and the initial value generating section 1324. Also, new functions are added to the second calculating circuit 1306 and to the calculator 1311 for calculating positions of new pixels, compared to the second embodiment.

The second calculating circuit 1306 is a block operated in accordance with the magnification/scale-reduction ratio with respect to the vertical direction and a clock signal indicated by a vertical effective period. The second calculating circuit 1306 generates: region control signals, i.e., vertical region movement command signals for shifting the regions in which the new pixels will be disposed with respect to the vertical direction; and vertical deletion region signals indicating regions in which new pixels do not need to be generated. The second calculating circuit 1306 includes comparators 1307 and 1309, a substractor 1308, and an adder 1310.

The comparator 1307 generates reduction non-authorization signals and outputs the generated signals to the substractor 1308 disposed thereoutside. If a parameter VC outputted from the adder 1310 indicates 0 (zero) or less, the reduction non-authorization signals are active. The reduction non-authorization signals are outputted as horizontal deletion region signals for indicating whether or not new pixels will be disposed in the regions. Also, the parameter VC is inputted into the substractor 1308 without being modified.

The substractor 1308 outputs the parameter VA calculated by subtracting the integer denominator of the magnification ratio with respect to the vertical direction from the parameter VC. Data, inputted to the substractor 1308, are, i.e., the denominator and the numerator of the magnification ratio with respect to the vertical direction, the parameter VC, the vertical effective signals, the reduction non-authorization signals, the line end signals and the clock. The substractor 1308 is operated every interpolated line with respect to the horizontal direction. The vertical effective signals, based on vertical synchronous signals, are generated by adding delays to sections corresponding to signals to convert the resolution.

The substractor 1308 sets initial values generated by the initial value generating section 1324 while the vertical effective signals are invalid, and outputs the initial value as the parameter VA. As long as the vertical effective signals are valid and the reduction non-authorization signals are inactive, the substractor 1308 outputs a value, i.e., a parameter VA, calculated by subtracting the integer denominator from the parameter VC. On the other hand, if the reduction non-authorization signals are active, the reduction does not occur. That is, the substractor 1308 outputs the parameter VC without modifying the parameter VA.

The comparator 1309 generates addition authorization signals from the parameter VA and outputs the generated signals to the adder 1310 disposed thereoutside. If the parameter VA is 0 (zero) or less, the addition authorization signals are active. The addition authorization signals are also outputted as vertical region movement command signals for indicating whether or not the regions, in which the new pixels will be disposed, are shifted. The parameter VA is also inputted to the adder 1310 without being modified.

The adder 1310 outputs the parameter VC, i.e., value calculated by adding the numerator of the magnification ratio with respect to the vertical direction to the parameter VA when the addition authorization signals are active. If the addition authorization signals are inactive, the adder 1310 outputs the parameter V C without modifying the parameter VA. The parameters VA and VC may be indicated with respect to units, i.e., 1/2. In order to enable the circuits of the present invention to handle these parameters, the parameters have a bit for indicating a radix point.

The calculator 1311 for calculating positions of new pixels calculates positions of the new pixels which will be disposed in the regions in which the new pixels will be disposed in accordance with the numerator of the magnification ratio with respect to the horizontal direction, the numerator of the magnification ratio with respect to the vertical direction, the parameter HC, and the parameter VC, and outputs the signals for indicating positions of the new pixels. When new pixels are generated based on the 16 pixels disposed in a 4×4 disposition of the original image, the new pixels are disposed in a region surrounded by 4 pixels D22, D23, D32, and D33. In this surrounded region, the calculator 1311 for calculating positions of new pixels calculates an internal dividing ratio for dividing the corresponding horizontal line segment and the corresponding vertical line segment.

The internal dividing ratio with respect to the horizontal direction is indicated by ratio (numerator of the magnification ratio with respect to the horizontal direction)−(parameter HC):HC. The internal dividing ratio with respect to the vertical direction is indicated by the ratio (numerator of the magnification ratio with respect to the vertical direction)−(parameter VC):VC The calculator 1311 for calculating positions of new pixels includes a substractor for calculating the above ratios. The parameter VC may be indicated with respect to units, i.e., 1/2. Therefore, the parameter VC and the value indicating (numerator of the magnification ratio with respect to the vertical direction)−VC have a bit for indicating a radix point. The signals for indicating positions of the new pixels are supplied to the interpolation-calculating section 104 as a source for generating the interpolation coefficients.

The mode determining section 1321 determines whether the mode for the signals of the original image inputted externally is the progressive mode or the interlace mode in accordance with the mode signals, and outputs the mode determining signals for indicating the determination results to the field determining section 1322 and the initial value generating section 1324. The field determining section 1322 is operable only when the mode determining signal indicates the interlace mode. The field determining section 1322 determines whether the inputted mode determining signals have an odd field or an even field in accordance with the field signals inputted externally, and outputs the field determining signals indicating the determination results to the initial value generating section 1324.

The conversion ratio determining section 1323 determines whether the resolution conversion is a magnification or a scale-reduction in accordance with the denominator and the numerator of the magnification ratio with respect to the vertical direction, and outputs conversion ratio determining signals as the determination results to the initial value generating section 1324. The conversion ratio is indicated by a form of irreducible fraction. Therefore, it will not occur that both the denominator and the numerator of the magnification ratio with respect to the vertical direction are even numbers. If neither one of the denominator and the numerator of the magnification ratio with respect to the vertical direction is an odd number, it can be understood that either of the denominator or the numerator of the magnification ratio with respect to the vertical direction is an even number.

The initial value generating section 1324 generates initial values, outputted to the substractor 1308, as a source for generating the parameter VA in the substractor 1308, in accordance with the mode determining signals, the field determining signals, the conversion ratio determining signals, and the denominator and the numerator of the magnification ratio with respect to the vertical direction. The initial values for generating the parameter VA are set variously in accordance with the mode determining signals, the field determining signals, and the conversion ratio determining signals, as shown in TABLE 1 below.

TABLE 1

| MODE DETERMINING SIGNAL: PROGRESSIVE MODE | INITIAL VALUES FOR GENERATING PARAMETER VA = NUMERATOR OF MAGNIFICATION RATIO WITH RESPECT TO THE VERTICAL DIRECTION (BASIC INITIAL VALUES SHOWN IN THE SECOND EMBODIMENT) |
|---|---|
| MODE DETERMINING SIGNAL: INTERLACE MODE | |
| CONVERSION RATIO DETERMINING SINGNAL: MAGNIFICATION | |
| FIELD DETERMINING SIGNAL: ODD FIELD | INITIAL VALUES FOR GENERATING PARAMETER VA = {(NUMERATOR OF MAGNIFICATION RATIO WITH RESPECT TO THE VERTICAL DIRECTION) + (DENOMINATOR OF MAGNIFICATION RATIO WITH RESPECT TO THE VERTICAL DIRECTION)}/2 |
| FIELD DETERMINING SIGNAL: EVEN FIELD | INITIAL VALUES FOR GENERATING PARAMETER VA = NUMERATOR OF MAGNIFICATION RATIO WITH RESPECT TO THE VERTICAL DIRECTION (BASIC INITIAL VALUES SHOWN IN THE SECOND EMBODIMENT) |
| CONVERSION RATIO DETERMINING SINGNAL: NON-MAGNIFICATION | |
| FIELD DETERMINING SIGNAL: ODD FIELD | INITIAL VALUES FOR GENERATING PARAMETER VA = NUMERATOR OF MAGNIFICATION RATIO WITH RESPECT TO THE VERTICAL DIRECTION (BASIC INITIAL VALUES SHOWN IN THE SECOND EMBODIMENT) |
| FIELD DETERMINING SIGNAL: EVEN FIELD | INITIAL VALUES FOR GENERATING PARAMETER VA = {3 × (NUMERATOR OF MAGNIFICATION RATIO WITH RESPECT TO THE VERTICAL DIRECTION) − (DENOMINATOR OF MAGNIFICATION RATIO WITH RESPECT TO THE VERTICAL DIRECTION)}/2 |

Calculations of the initial values for determining the parameter VA include magnification ratio indicated with respect to units, i.e., 1/2. Therefore, if neither of the denominator and the numerator of the magnification ratio with respect to the vertical direction is an odd numbers, the magnification ratio cannot be indicated by an integer. In order to enable the initial values for generating the parameter VA, these parameters have a bit for indicating a radix point. Data, i.e., magnification/scale-reduction ratio are set by the CPU and set in registers. Also, signals supplied from a device, i.e., a timing generator, can be used for the horizontal effective signals, vertical effective signals, the line end signals, the mode signals, and the field signals. Frequency of the clock signal is not limited to be in a particular range as long as the circuits are properly operable.

Operations in the second calculating circuit 1306 are explained with reference to an example of the magnification ratio 11/9. The first calculating circuit 1301 has the same structure as the structure of the first calculating circuit 301 explained in the second embodiment. Therefore, explanations for the second calculating circuit 1306 are omitted. When the first clock signal in corresponding to the first line is generated, the vertical effective signal is invalid. The clocks generated subsequently are valid. A period, in which signals are outputted from the substractor 1308 and returned to the substractor 1308 again, is a frequency corresponding to one line. Also, an example, in which the initial values must be handled extraordinarily, is explained as follows. In this example, the mode determining signal indicates the interlace mode, and the field determining signal indicates the odd field.

The conversion ratio determining section 1323 compares the numerator 11 and the denominator 9 of the magnification ratio with respect to the vertical direction, and determines that the magnification ratio indicates magnification (enlargement).

The enlargement is conducted in the odd field in the interlace; therefore, the initial value generating section 1324 sets the initial value 10 in accordance with a calculation (11+9)/2 in which 11 indicates the numerator and 9 indicates the denominator.

A numeral 10 as the initial value, generated in the initial value generating section 1324, is set in the substractor 1308, and the initial value 10 is outputted.

The initial value 10 does not indicate a value less than 0 (zero); therefore, the comparator 1309 outputs an inactive addition authorization signal.

The outputted addition authorization signal is inactive; therefore, the adder 1310 outputs the initial value 10 without modifying it.

The initial value 10 does not indicate a value less than 0 (zero); therefore, the comparator 1307 outputs an inactive reduction non-authorization signal.

The outputted reduction non-authorization signal is inactive; therefore, the substractor 1308 outputs 1 by subtracting 9 from 10.

The initial value 1 does not indicate a value less than 0 (zero); therefore, the comparator 1309 outputs an inactive addition authorization signal.

The outputted addition authorization signal is inactive; therefore, the adder 1310 outputs the initial value 1 without modifying it.

The initial value 1 does not indicate a value less than 0 (zero); therefore, the comparator 1307 outputs an inactive reduction non-authorization signal.

The outputted reduction non-authorization signal is inactive; therefore, the substractor 1308 outputs −8 by subtracting 9 from 1.

The outputted value −8 is less than 0 (zero); therefore, the comparator 1309 outputs an active addition authorization signal.

The addition authorization signal is active; therefore, the adder 1310 outputs 3 by adding 11 (numerator of the magnification ratio with respect to the vertical direction) to −8.

The initial value 3 does not indicate a value less than 0 (zero); therefore, the comparator 1307 outputs an inactive reduction non-authorization signal.

The outputted reduction non-authorization signal is inactive; therefore, the substractor 1308 outputs −6 by subtracting 9 from 3.

The outputted value −6 is less than 0 (zero); therefore, the comparator 1309 outputs an active addition authorization signal.

The outputted addition authorization signal is active; therefore, the adder 1310 outputs 5 by adding 11 to −6.

The same operations are repeated.

The outputted values from the adder 1310 are 1, 3, 5, 7, 9, 11, 2, 4, 6, 8, and 10 with respect to the clock signal after the vertical effective signal is valid. Thus, 11 clock signals indicate one cycle of the outputted values. The addition authorization signals are inactive in a first clock in which 1 is outputted and in a seventh clock in which 2 is outputted. Also, the vertical region movement command signal is inactive. In such a case, a region in which new pixel is generated is not shifted. That is, new pixels are generated in one region twice. On the other hand, the reduction non-authorization signals are always inactive. Also, the vertical deletion region signals S212 are inactive. Therefore, the new pixels need to be disposed in every region.

The internal dividing ratios, calculated by the calculator 1311 for calculating positions of new pixels in accordance with the parameter VC, are 1:10, 10:1, 8:3, 6:5, 4:7, 2:9, 0:11, 9:2, 7:4, 5:6, 3:8 etc.

A modified example of the third embodiment is explained. In this modified example, the compensation shown in FIG. 21D for shifting the positions of the lines after the resolution conversion is not conducted. Instead, the lines after the resolution conversion are generated in the positions shown in FIG. 21B. With respect to the shifting of the first interpolated line upwardly from the first line corresponding to the original image, it is necessary to shift all positions of the upwardly-shifted interpolated lines so as to coincide with the first interpolated line corresponding to the original image.

The modified example is different from the third embodiment as follows.

Firstly, the conversion ratio determining section 1323 is not provided in the modified example.

Secondly, the initial value generating section 1324 does not determine whether or not the conversion ratio determining signal indicates magnification (enlargement).

Thirdly, the calculator 1311 for calculating positions of new pixels has compensating functions.

These three differences are explained in details as follows.

The conversion ratio determining section 1324 is not provided in the modified example; therefore, the conversion ratio determining signals do not exist in the modified example. The initial value generating section 1324 is operated in the same manner regardless of whether or not the conversion ratio indicates magnification (enlargement). That is, the initial values for generating the parameter VA are set variously as shown in TABLE 2 below

TABLE 2

| MODE DETERMINING SIGNAL: PROGRESSIVE MODE | INITIAL VALUES FOR GENERATING PARAMETER VA = NUMERATOR OF MAGNIFICATION RATIO WITH RESPECT TO THE VERTICAL DIRECTION (BASIC INITIAL VALUES SHOWN IN THE SECOND EMBODIMENT) |
|---|---|
| MODE DETERMINING SIGNAL: INTERLACE MODE | |
| FIELD DETERMINING SIGNAL: ODD FIELD | INITIAL VALUES FOR GENERATING PARAMETER VA = NUMERATOR OF MAGNIFICATION RATIO WITH RESPECT TO THE VERTICAL DIRECTION |
| FIELD DETERMINING SIGNAL: EVEN FIELD | INITIAL VALUES FOR GENERATING PARAMETER VA = {3 × (NUMERATOR OF MAGNIFICATION RATIO WITH RESPECT TO THE VERTICAL DIRECTION) - (DENOMINATOR OF MAGNIFICATION RATIO WITH RESPECT TO THE VERTICAL DIRECTION)}/2 |

The calculator 1311 for calculating positions of new pixels further includes compensating functions for replacing the parameter VC with the numerator of the magnification ratio with respect to the vertical direction if the parameter VC exceeds the numerator of the magnification ratio with respect to the vertical direction, and calculates the internal dividing ratio with respect to the vertical direction in accordance with the ratio (compensated parameter VC):(numerator of the magnification ratio with respect to the vertical direction)−(compensated VC). With respect to the horizontal direction, operations in the modified example are the same as those explained in the third embodiment. The parameter VC may exceed the numerator of the magnification ratio with respect to the vertical direction because the initial value for generating the parameter VA is set by the formula: {3×(numerator of magnification ratio with respect to the vertical direction)−(denominator of magnification ratio with respect to the vertical direction)}/2 in the initial value generating section 1324 in magnification (enlargement).

As long as the parameter VC exceeds the numerator of the magnification ratio with respect to the vertical direction, the parameter will never be determined to be 0 (zero) or less by the comparator 1309. Therefore, the vertical region movement command signal does not indicate to move the region in which the new pixels will be generated. Also, the calculator 1311 for calculating positions of new pixels sets the positions of the new pixels in the region in accordance with a compensated value generated based on the numerator of the magnification ratio with respect to the vertical direction. Accordingly, in the regions, the new pixels are generated in positions corresponding to a first line corresponding to the original image.

As explained above, in the modified example, if the mode determining section 1321 determines that the mode determining signal indicates the interlace mode in accordance with the inputted signals, the field determining section 1322 identifies the field, i.e., the odd field or the even field. The initial value generating section 1324 generates initial values corresponding to the identified field in accordance with the resolution conversion ratio with respect to the non-line direction, and supplies the generated initial values to the second calculating circuit 1306. By doing this, it is possible to realize the same effects as those realized in the second embodiment and determine the regions corresponding to the identified fields. Also, it is possible to equalize intervals between the lines generated when synthesizing the fields.

Also, the initial value generating section 1324 compensates the initial values of the parameter VA in accordance with the determination results by the conversion ratio determining section 1323. By doing this, it is possible to set the positions of the new pixels generated in the regions after the resolution conversion so that there are sufficient pixels of the original image for surrounding the new pixel and generating the new pixels.

Embodiments of the present invention have been explained above in detail with reference to the drawings. However, it should be understood that the drawings and detailed description are not intended to limit the invention to the particular forms disclosed; thus, the invention disclosed herein is open to various modifications and alternative forms, i.e., design changes.

In the present invention, it is possible to calculate the pixel values of the new pixels in accordance with 16 pixel values disposed around the new pixels. In addition, in the present invention, it is possible to calculate the pixel values of the new pixels in the region surrounded by at least four pixels of the original image by interpolating the pixel values of the pixels in the original image. In the present invention, it is possible to control so that the region in which the new pixels will be generated can be determined easily, and determine the interpolation coefficients used for the interpolation appropriately without calculating the positions of the new pixels.

What is claimed is:

1. An image resolution converting device for converting an original image into an image of a predetermined resolution, the image resolution converting device comprising:
   a pixel value storage section for storing the pixel values of the pixels included in the original image;
   a region determining section for successively determining regions, disposed newly generated pixels in accordance with a raster-scanned disposition order of the newly generated pixels based on a resolution conversion ratio corresponding to the predetermined resolution;
   a pixel value read-out controlling section for generating output-control signals serving for outputting the pixel values of the pixels, included in the pixel groups corresponding to the determined regions from the pixel value storage section in accordance with the determined regions; and
   an interpolation-calculating section for calculating interpolations of pixel values of the newly generated pixels in accordance with the interpolated pixel values included in the pixel groups, the outputted pixel values corresponding to the predetermined resolution conversion ratio; wherein said interpolation-calculating section further comprises:
   an interpolation coefficient storage section storing groups of interpolation coefficients, to be multiplied by the pixel values included in the pixel groups, in a plurality of addresses, under the conditions that: the resolution conversion ratio is indicated by a fractional expression having an integer numerator and an integer denominator; a total of the addresses is indicated by the integer of the numerator; and each one of the groups of the interpolation coefficients is stored in each group of the pixels;
   an interpolation coefficient read-out controlling section generating signals for designating the addresses so as to be synchronous with the output-control signals; and
   a pixel-value-calculating section calculating the pixel values of the newly generated pixels in accordance with the groups of the interpolation coefficients, outputted from the interpolation coefficient storage section in accordance with the signals for designating the addresses, and the pixel values included in the pixel group outputted from the pixel value storage section.

2. An image resolution converting device according to claim 1, wherein the region determining section comprises:
   a first calculating circuit determining the regions in accordance with the resolution conversion ratio and with respect to a line direction of the image; and
   a second calculating circuit determining the regions in accordance with the resolution conversion ratio and with respect to a non-line direction crossing the line direction.

3. An image resolution converting device according to claim 2, wherein the interpolation-calculating section further comprises:
   an image concentration determining section for determining concentration properties included in the original image; and
   a coefficient selecting section for selecting the interpolation coefficients in accordance with the determination results of the concentration properties, wherein the interpolation coefficients stored in the interpolation coefficient storage section includes the concentration properties included in the original image.

4. An image resolution converting device according to claim 2, wherein the region determining section determines position for disposing the newly generated pixel in each of the previously determined regions.

5. An image resolution converting device according to claim 4,
   wherein the interpolation-calculating section calculates the pixel value of the newly generated pixel in accordance with the determined positions.

6. An image resolution converting device according to claim 2, wherein the region determining section further comprises:
   a mode determining section for receiving a mode signal having a mode regarding the original image for determining whether the mode signal is a progressive mode or an interlaced mode;
   a field determining section for determining whether a field included in the original image is an odd field or an even field if the mode signal, is the interlace mode; and
   an initial value generating section for generating initial values used by the second calculating circuit for determining positions in accordance with the resolution conversion ratio with respect to the non-line direction and the determination result from the field determining section.

7. An image resolution converting device according to claim 6, wherein,
   the region determining section further comprises a conversion ratio determining section for determining whether the resolution conversion ratio indicates an enlargement or a scale-reduction, and
   the initial value generating section generates the initial values in accordance with the resolution conversion ratio with respect to the non-line direction, the determination result from the field determining section, and the determination result from the conversion ratio determining section.

* * * * *